United States Patent

Burgarella

[15] 3,641,891

[45] Feb. 15, 1972

[54] EXPOSURE CONTROL SYSTEM

[72] Inventor: John P. Burgarella, Sudbury, Mass.

[73] Assignee: Polaroid Corporation, Cambridge, Mass.

[22] Filed: June 30, 1969

[21] Appl. No.: 837,688

[52] U.S. Cl. ..............................95/10 CE, 95/53 E, 95/64 A

[51] Int. Cl. ......................G03b 7/08, G03b 7/16, G01l 1/46

[58] Field of Search ...................95/10 C, 53, 53 E, 64, 64 A; 250/206, 211, 214, 215

[56] References Cited

UNITED STATES PATENTS

| | | | |
|---|---|---|---|
| 3,053,985 | 9/1962 | Grammer, Jr. et al. | 95/10 C X |
| 3,292,516 | 12/1966 | Sato et al. | 95/10 C |
| 3,299,789 | 1/1967 | Chandler et al. | 95/10 C X |
| 3,362,309 | 1/1968 | Cooper, Jr. et al | 95/10 C |
| 3,397,629 | 8/1968 | Mori et al | 95/10 C |
| 3,411,421 | 11/1968 | Bestenreiner | 95/10 C |
| 3,416,421 | 12/1968 | Biedermann et al. | 95/10 C |
| 3,464,332 | 9/1969 | Davison et al | 95/10 C |
| 3,482,497 | 12/1969 | Ernisse | 95/64 X |

FOREIGN PATENTS OR APPLICATIONS

| | | | |
|---|---|---|---|
| 40/18175 | 1965 | Japan | 95/10 CE |

*Primary Examiner*—Joseph F. Peters
*Attorney*—Brown and Mikulka, William D. Roberson and Gerald L. Smith

[57] ABSTRACT

An exposure control system for photographic apparatus which functions automatically to regulate both exposure apertures and exposure interval. The system is operable under an exposure program wherein over a select range of light levels, aperture area is varied with respect to scene light values in a relationship less than 1:1. The system provides for sequential regulation first of aperture, then of exposure interval. Voltage-sensitive triggering circuits are used for controlling the apertures and shutter mechanisms. These circuits are coupled to receive the output of a light-sensitive circuit and are arranged in series with a power source to develop a voltage reference level for use with differential amplification stages within the system. The system is calibrated or accommodating varying sensitometric characteristics of films through the use of a gain control in connection with an amplification stage. The system is capable of operating under a predetermined exposure program through the use, inter alia, of an aperture control arrangement which functionally relates aperture blade dynamics, the output of a photosensing circuit and the signal of a function generator.

79 Claims, 12 Drawing Figures

INVENTOR.
JOHN P. BURGARELLA
BY Brown and Mikulka
and
Gerald L. Smith
ATTORNEYS

INVENTOR.
JOHN P. BURGARELLA
BY Brown and Mikulka
and

INVENTOR.
JOHN P. BURGARELLA
BY Brown and Mikulka
and
Gerald L. Smith
ATTORNEYS

PATENTED FEB 15 1972

3,641,891

INVENTOR.
JOHN P. BURGARELLA
BY Brown and Mikulka
and
Gerald L. Smith
ATTORNEYS

INVENTOR.
JOHN P. BURGARELLA
BY Brown and Mikulka
and
Gerald L. Smith
ATTORNEYS

PATENTED FEB 15 1972

3,641,891

INVENTOR.
JOHN P. BURGARELLA
BY Brown and Mikulka
and
Gerald L. Smith
ATTORNEYS

INVENTOR.
JOHN P. BURGARELLA
BY Brown and Mikulka
and
Gerald L. Smith
ATTORNEYS

INVENTOR.

JOHN P. BURGARELLA

BY Brown and Mikulka and Gerald L. Smith

ATTORNEYS

INVENTOR.
JOHN P. BURGARELLA
BY Brown and Mikulka
and
Gerald L. Smith
ATTORNEYS

EXPOSURE CONTROL SYSTEM

BACKGROUND OF THE INVENTION

Automatic exposure control systems for photographic devices basically evaluate scene brightness or levels of illumination, weight this evaluation with respect to the sensitometric characteristics of a film being exposed and regulate one or more variable exposure control parameters such as exposure interval or aperture size in correspondence with the weighted evaluation. Scene brightness evaluation for the systems is performed with light-measuring circuits utilizing one or more photosensitive elements. The elements are aligned to be responsive to the light characteristics of a scene somewhat coincident with the field of view of an objective or taking lens system.

Some control systems are of a semiautomatic variety, their operation being restricted to the automatic regulation of only one exposure parameter. The exposure interval is often the parameter selected for such control, the interval being determined by integrating the output of a light-sensitive circuit over a period of time.

With such a semiautomatic control arrangement, aperture settings may be fixed within the system or manually preselected prior to each exposure or series of exposures. In manually regulating aperture setting, the photographer may call upon his personal expertise to assess the light level of a scene and the nature of the subject matter being photographed. He may have to balance the sometimes conflicting requirements to obtain large depth of field with small relative apertures and correspondingly long exposures, or to stop subjects in motion with short exposure times and correspondingly large relative apertures.

An exposure control system which automatically regulates both exposure interval and relative aperture should ideally be capable of generating a somewhat optimized exposure parameter combination to achieve in general the best depths of field and shutter speeds available at any scene light level. To accomplish this, the system should operate under a predetermined exposure program wherein each of the exposure parameters is uniquely weighted in accordance with particular scene light levels. Such an exposure program should be selected such that over a broad range of scene light levels each of the exposure parameters employed for each exposure will generally represent the best compromise between competing considerations.

A practical exposure control system should also be readily adaptable for operation with transient scene lighting as generated by photoflash devices. To achieve these results in a fully automated dual parameter exposure control system is difficult.

SUMMARY OF THE INVENTION

The present invention is addressed to a photographic exposure control system which automatically regulates both relative aperture and exposure interval in accordance with scene lighting. This regulation is provided under a predetermined program of apertures and shutter intervals which weights the contribution of each exposure parameter over a range of scene light levels most frequently encountered in photographic practice. The program interrelates shutter speed and relative aperture to derive highly desirable photographic results.

To operate in accordance with the program, the controlled exposure parameters are sequentially regulated, the system operating first in an aperture-determining mode and then in a shutter-timing mode. In this sequence, aperture is initially controlled such that, over a given range of light levels, aperture area is varied with respect to scene light values in a relationship by which the product of brightness and effective aperture area increases with selected brightness levels. This relationship is made continuous over a range of light levels through the use of an aperture mechanism which, when actuated, begins to define a continuously enlarging aperture area over the lens system of the apparatus. Simultaneously with this aperture variation, a light-sensing circuit incorporating a photocell oriented with respect to the scene being photographed generates an output signal which is a function of the level of scene light. The light input to the photocell is varied in synchronous coordination with the aperture variation such that the signal provided by the light-sensitive circuitry is responsive to both relative aperture and the light levels of a scene being photographed. The light-sensing circuitry functions in conjunction with a voltage-sensing circuit to actuate a braking arrangement for halting the aperture mechanism at a position defining an aperture conforming to the exposure program.

To correlate the aperture-defining control arrangement of the invention with the exposure program, the system provides means for adjusting the output of the light-sensitive circuit. In a preferred embodiment while the system is functioning in its aperture-determining mode an electrical signal is generated by a function generator. This signal, when combined with the output of the light-sensitive circuit, derives a control function for the aperture mechanism which operates it in conformance with the predetermined program. The electrical signal of the generator is a function of the dynamic characteristics of the aperture mechanism.

The programmed aperture control is also a function of the dynamics of the aperture diaphragm or blade brake mechanism. By correlating the time element required to halt or "clamp" this mechanism at an appropriate aperture setting with the adjusted light-sensing circuit output, a desired exposure programming function is achieved.

As another aspect of the invention, the above-noted function generator may be used in a dual capacity. Particularly where transient or flash illumination is utilized, the programming signal of the generator may be used in a sequencing operation to actuate the voltage-sensitive-triggering circuitry of the system.

Following an automatic selection of aperture, the control system in the shutter-timing mode actuates a shutter mechanism in a manner providing an exposure interval responsive to the level of scene light and to the previously selected aperture. This function is carried out by directing the output of the above-discussed photocell into a timing circuit. The timing circuit provides for the integration of the output of the photocell over an interval determined in accordance with the reference level of a second triggering circuit. Upon reaching this reference level, the triggering circuit functions to cause a termination of the exposure.

Another feature of the invention provides for the common coupling of the above-described aperture regulating trigger circuit and exposure interval regulating trigger circuit with the output of the light-sensing circuit. To assure the operation of the trigger circuits in an appropriate sequence, that trigger circuit operated in conjunction with exposure interval regulation is made responsive to higher signal levels.

Another aspect of the control system of the invention resides in the means for adjusting its operation to varying film speeds. The exposure control functions are adjusted for response in accordance with film speed through the use of an amplification stage. This amplification stage is coupled to receive the output signals of the aperture regulating and exposure interval regulating functions. By controlling the gain of the amplification stage to selectively adjust the output of the light sensitive circuitry, the control system is readily conformed to the sensitometric properties of a particular photographic film.

In one embodiment, the control system of the invention utilizes one or more amplification stages of a differential variety which require a tapped DC power input for establishing a reference level voltage. The circuitry of the invention uniquely establishes this reference level for the amplification stages by inserting the above-discussed trigger circuits in a symmetrical voltage-proportioning arrangement with the power supply of the circuitry. While the trigger circuits are coupled to receive the signal of the light-sensing circuitry, they are mutually arranged in series with the power supply of the system. The reference level is thereby established at the common junction of the triggering circuits. A voltage balance between the circuits is maintained, even though one triggering circuit is caused to change state, through the positioning of an emitter-follower arrangement and resistance means across the normally conducting output stage of one of the trigger circuits, in particular the aperture-triggering circuit.

Another aspect of the invention is the provision of an auxiliary timing circuit for use with the control system which may be selectively coupled into the system for establishing a fixed exposure interval for a flash mode of operation. The auxiliary timing arrangement functions in conjunction with the light-sensitive timing circuitry of the invention to establish a maximum exposure interval for artificial or flash mode illumination. Accordingly, for flash mode operation, the exposure control system of the invention may be sensitive to both ambient illumination and illumination derived artificially, thereby providing a "fill-in" flash function.

A further aspect of the invention is the provision of a circuit alignment arrangement for the voltage-sensitive triggering circuits of the invention. By coupling capacitor means between a terminal of the power source and an input terminal of a triggering circuit, the voltage at the input terminal of the circuit is adjustable to a preexposure operational state.

The invention accordingly comprises the system, apparatus and method possessing the features, technique and properties which are exemplified in the description to follow hereinafter and the scope of the invention is indicated in the appended claims.

DETAILED DESCRIPTION OF THE DRAWINGS

The control system of the invention responds to scene light levels first to regulate an aperture-determining mechanism, then to control an exposure timing mechanism. Each of these exposure parameters combine with the other as a component of an exposure value corresponding to scene brightness. The relative contribution of each of the parameters is predetermined in accordance with an exposure program selected to achieve a high photographic quality over a broad range of scene light levels. In the description to follow, the general exposure program is discussed in connection with FIG. 1, the aperture-regulating function and its circuitry in connections with FIGS. 2 through 4 and the exposure interval circuitry in connection with FIG. 3. Following the above, an exposure control mechanism is described in connection with FIGS. 5 through 11 which is operable with the circuitry of the system.

THE EXPOSURE PROGRAM

Figure 1:
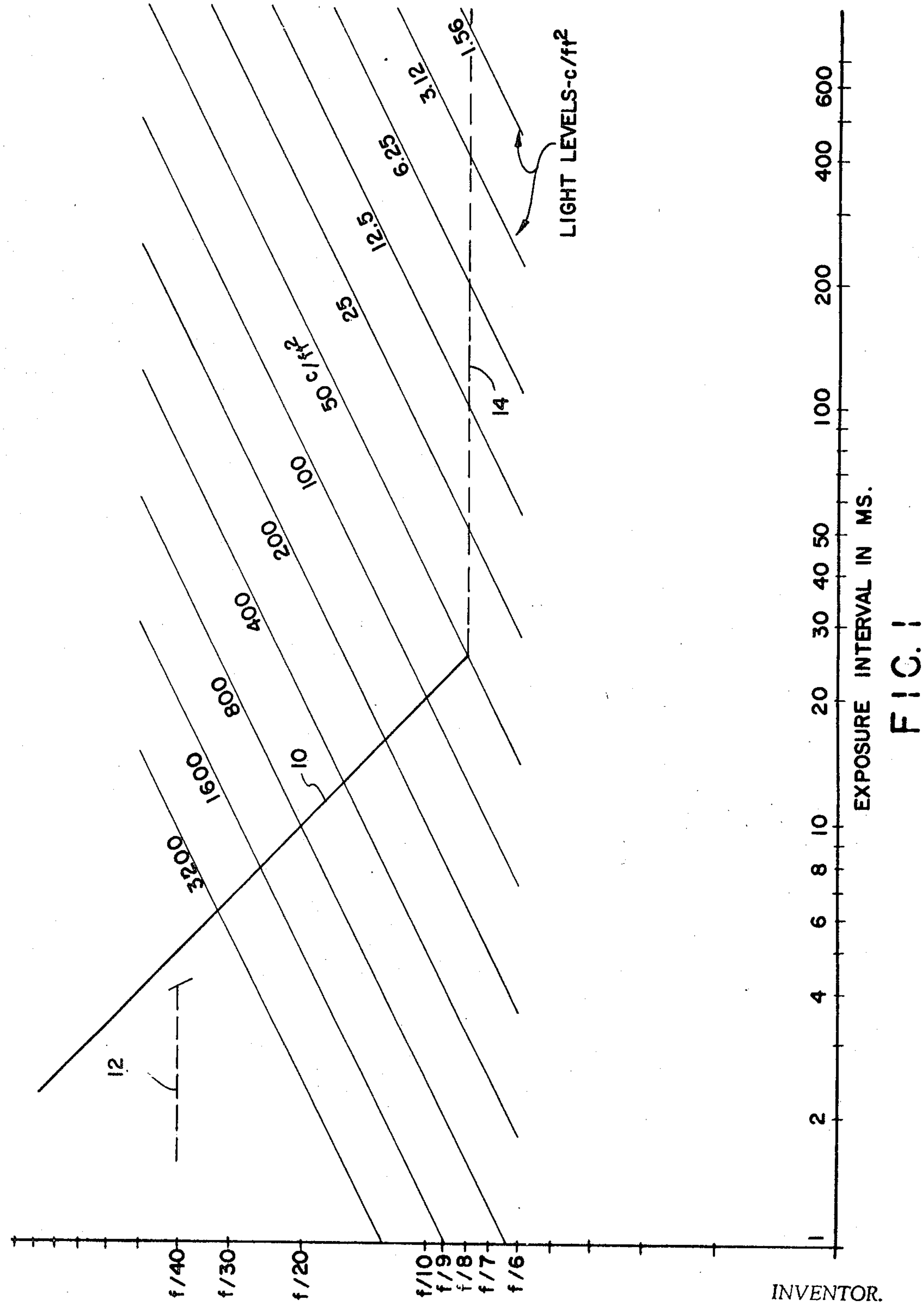
FIG. 1 illustrates an exposure control program according to the invention as a graph-relating aperture and exposure interval in log-log scale and depicting the operation of the program in relation to a range of scene light levels for a particular film speed.

Referring to FIG. 1, a program under which the control system of the invention may perform is illustrated. The program is represented as a curve 10 relating relative aperture and exposure interval as provided by an exposure mechanism for a family of representative scene light levels and for a photographic film of a given speed. Curve 10 defines constant aperture values along its dashed extensions 12 and 14. As curve 10 extends upward, aperture becomes increasingly smaller until it reaches zero representing a position for an exemplary shutter wherein no light is admitted through a taking lens. In some applications, an upward limit or terminal position for the smallest aperture value is preselected as depicted at curve extension 12. Correspondingly, curve extension 14 represents a maximum aperture setting or terminal position available with such an exposure mechanism. Superimposed over the curve 10 and its extensions is a family of curves representing scene light levels ranging, in geometrically progressing octaves of intensity, from a minimum light level of 1.56 C./ft.$^2$ (candles per square foot) to a maximum level of 3,200 C./ft.$^2$.

The light levels most frequently encountered in outdoor photography range from values of about 50 C./ft.$^2$ to about 800 C./ft.$^2$. Note in this regard that the sloping solid portion of the curve 10 generally falls within this range.

An exposure mechanism operating under a program defined by curve 10 and with films having speeds corresponding with the chart illustrated (for instance of A.S.A. 75) will provide a maximum aperture, defined along curve extension 14 at about *f*/8 for relatively low light values ranging from 1.56 C./ft.$^2$ to 50 C./ft.$^2$. Along this subrange, for each octave increase in brightness, for instance from 6.25 C./ft.$^2$ to 12.5 C./ft.$^2$, the exposure interval will halve or reduce by an octave. Accordingly, there exists a one-to-one relationship between scene light levels and the exposure interval parameter up to the inflection point of the curve at about 50 C./ft.$^2$. This inflection point represents an exposure interval of about 25 milliseconds or one-fortieth of a second. The position of the lower inflection point may be selected to represent a relatively long shutter interval at which a small camera may nevertheless be hand supported and operated without blurring a picture as a result of normal operator movement. From the lower inflection point, the instant program varies both aperture and exposure interval and is depicted by the solid sloping portion of the curve. The slope indicates that over the most frequently encountered range of light levels, both aperture and exposure interval parameters are related to variations in light level values in a proportion of less than one-to-one. From the program relationships illustrated in FIG. 1, it can be seen that when the plotted F numbers are converted to effective aperture area, the product of brightness and the effective aperture area increases with increasing brightness levels over the brightness range encompassed by curve 10. In particular, the curve 10 is selected to provide an aperture variation with respect to exposure interval in accordance respectively with a ratio of ⅔:⅓. That is to say, that for any change in brightness level over this range, two-thirds of the necessary change in exposure parameters is provided by aperture variation and one third by variation of exposure interval.

To achieve the continuous or smooth variation of aperture with light levels as illustrated in connection with curve 10, the control system of the invention utilizes an aperture regulating mechanism capable of defining continuous aperture values between its minimum and maximum terminal positions. At the commencement of an exposure cycle, this mechanism provides progressively enlarging aperture areas from one terminal position to the other until halted at a position appropriate for the light level of the exposure. Control of this arrangement for arresting the aperture variation is provided by electronic control system including light-sensing circuitry utilizing at least one photoelectric cell. The relative status of the enlarging aperture is determined by a mechanism which functions to "-scan" or alter the amount of scene light reaching the photoelectric cell in synchronism and a corresponding variation with the continual adjustment of aperture size. As a result, the output signal derived from the photocell circuit corresponds with the relative aperture defined by the aperture mechanism at any given level of light. The details of an embodiment for such a mechanism are discussed in connection with FIGS. 6 through 11.

Figure 2:
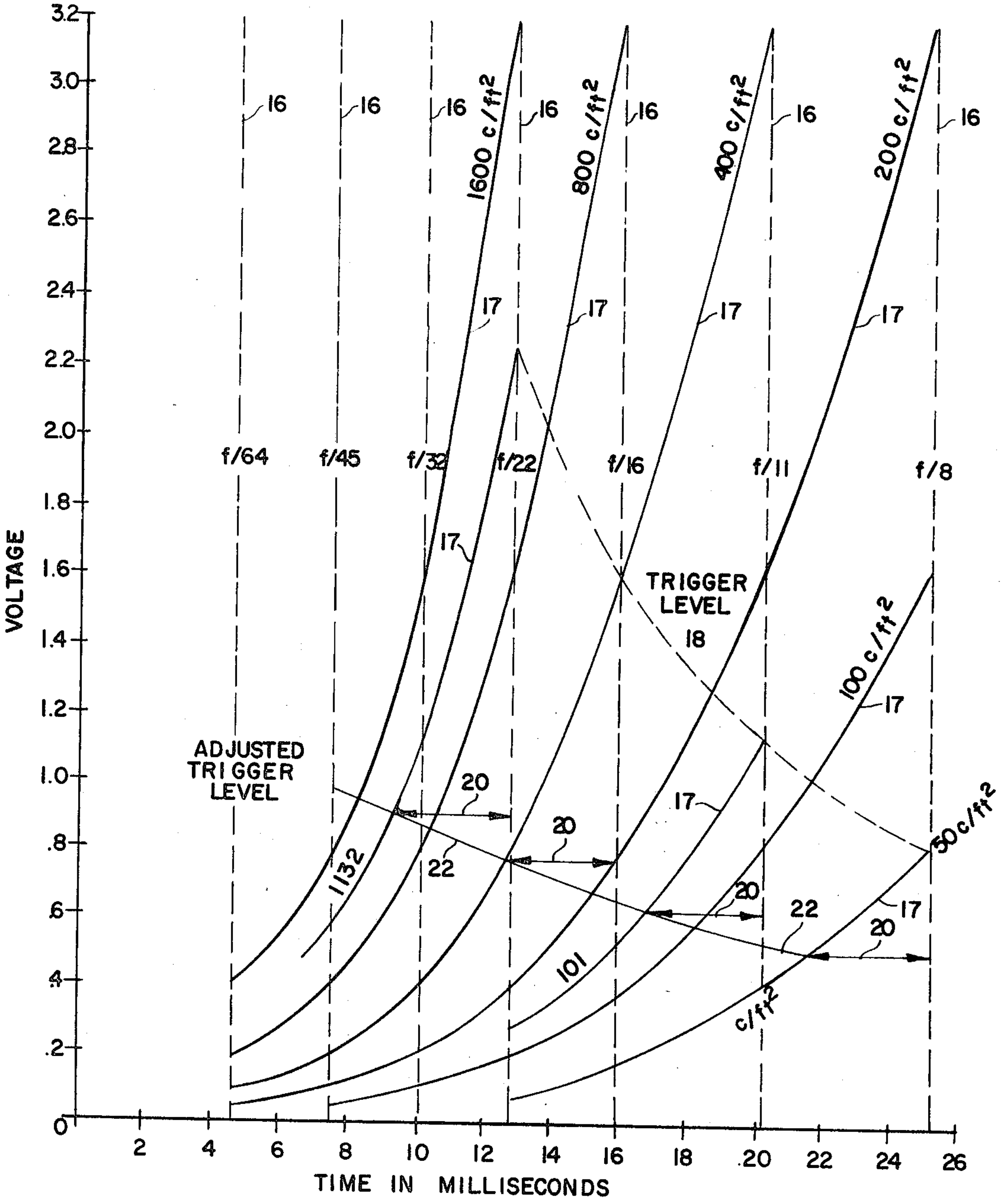
FIG. 2 is a chart showing a family of curves representing output characteristics for various levels of scene lighting as derived by the light-sensing circuitry of the invention during an aperture-adjusting sequence.

Referring to FIG. 2, the voltage characteristics of an aperture-responsive signal produced by a light-sensitive electronic control system operating with an aperture mechanism as above described are plotted as a family of curves 17 for a range of scene light levels. Inasmuch as the relative aperture defined by the exposure mechanism is a function of the time required for the mechanism to open from a minimum aperture of, for instance, *f*/64 to a maximum aperture of, for instance *f*/8, the abscissa of the graph of FIG. 2 is scaled in milliseconds of time representing this dynamic opening characteristic. The apertures defined by the mechanism as it moves between terminal positions are shown as vertical dashed reference lines ranging from *f*/64 at about 4.5 milliseconds (ms.) to *f*/8 at about 25 milliseconds. These reference lines are identified at 16.

To halt the aperture-defining mechanism at a position appropriate for operation under a desired exposure program, a voltage-sensitive clamping system may be employed. To achieve the program described in connection with FIG. 1, the voltage-sensitive clamping or brake system preferably operates in response to the attainment by the aperture-responsive signal a trigger level such as that identified at dashed curve 18. This curve, ranging in somewhat complex fashion from 2.26 volts to 0.8 volts, represents an idealized function which assumes no delay in clamping or halting the aperture mechanism. In practice, this delay is about 3.5 ms. Curve 18 can be adjusted to accommodate for this delay by plotting corresponding points on curve 18 adjusted by the 3.5 ms. value shown at 20. This operation derives the adjusted trigger level 22 under which the aperture control mechanism should operate. A derivation of such a varying trigger level is not readily accomplished with conventional exposure mechanisms. The present exposure control system is capable of generating such an aperture control program with both simplicity and reliability.

GENERAL CIRCUITRY

Figure 3:
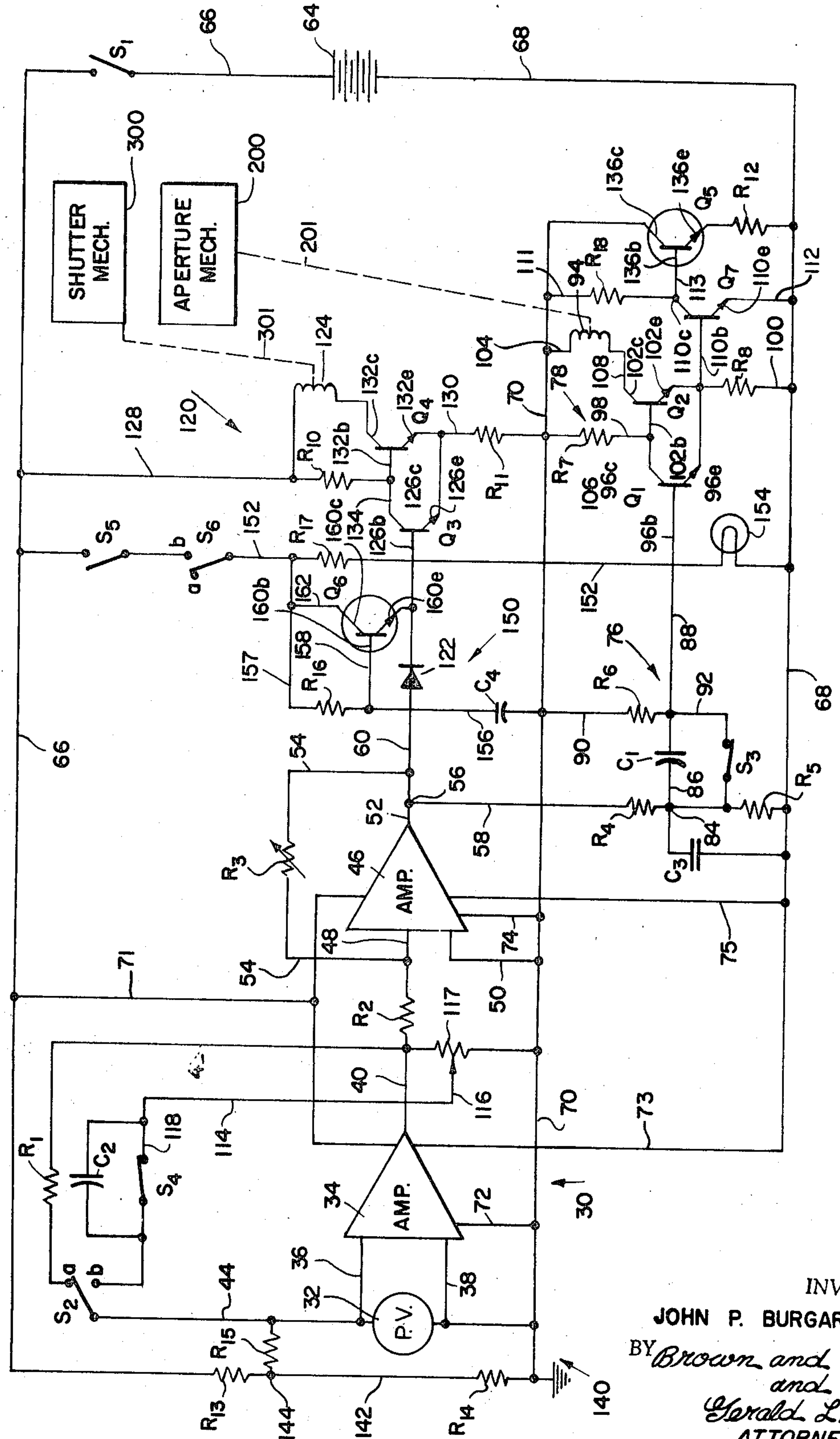
FIG. 3 is a schematic diagram of a circuit for the control system of the invention.

The circuitry of the control system of the invention functions initially to regulate an aperture mechanism in accordance with a program such as discussed in connection with FIGS. 1 and 2 and, in sequence, to regulate the corresponding exposure interval parameter in accordance with the programmed exposure parameters. Referring to FIG. 3, the circuitry employed for performing this sequential mode of regulation or control is portrayed. Scene light levels are evaluated by a light-sensing circuitry shown generally at 30. Circuit 30 includes a photovoltaic cell or light detector 32 which generates an output signal treated by an amplifier stage 34. Light detector 32 may be mounted upon a photographic camera structure and oriented to evaluate the light levels of a scene coincident with the field of view of the lens system of the camera. The photocell operates in conjunction with the earlier described aperture-scanning arrangement which alters the amount of scene light reaching the cell in synchronism and corresponding variation with an adjustment of aperture size. Cell 32 is coupled with the amplifier stage 34 along input lines 36 and 38. The amplifier 34 is of a type sometimes referred to in the art as an "operational amplifier." For the present application it is of a differential variety preferably fabricated in practical, miniaturized form.

When considered ideally, the amplifier 34 has infinite gain and infinite input impedance and a zero output impedance. By virtue of a feedback path connected between the output 40 of amplifier 34 and its input, the cell 32 is permitted to operate into an apparent low-input impedance. The feedback path includes line 42, a feedback resistor $R_1$ and line 44. Since the cell 32 operates in conjunction with a low-input impedance, it is permitted to function in a current mode and its output current permits the generation of a voltage across the feedback resistor $R_1$ which is witnessed at the output line 40. For the present illustration, the output signal voltage may be considered equivalent to the exemplary output voltage characteristics for various light values described in connection with FIG. 2. The operational amplifier arrangement of the light-sensing circuitry 30 is described in detail in a copending application for U.S. Pat. by the present inventor entitled, "Automatic Exposure Control System with Fast Linear Response," Ser. No. 783,855 filed Dec. 16, 1968.

The voltage signal present at the output line 40 of the light-sensing circuitry is introduced through a calibrating resistor $R_2$ to a second amplification stage 46. Amplifier 46 may be structured identically with the operational amplifier 34 of the light-sensitive circuit. Accordingly, it is of a differential variety having input lines 48 and 50 and an output at 52. A feedback path including a line 54 and a variable resistor $R_3$ is connected between the output 52 and input line 48 of the amplifier. The feedback resistor $R_3$ provides a means for varying the gain of amplifier 46. Accordingly, the resistor $R_3$ may be used to adjust the level of the output signal of light-sensing circuitry 30 in accordance with the sensitometric properties of the film or photosensitive material being used with the exposure control system. Indicia may be provided with the wiper arm of the resistor for indicating proper settings corresponding to a variety of film speeds. Any arrangement functioning to selectively vary the relationship of input to output at stage 46 is considered a gain adjustment.

Having been adjusted at the amplification stage 46, the light-responsive signal at output 52 is present at a common output terminal 56 to which are coupled parallel output lines 58 and 60.

Power supply to the above-described light-sensing circuit 30 and second amplification stage 46 is derived from a DC source such as a battery 64, the positive and negative terminals of which are respectively coupled to positive and negative bus lines 66 and 68. To activate the system, a power supply switch $S_1$ is inserted in bus 66. The differential amplification stages 34 and 46 require the presence of reference level or ground and such level is provided along a third bus line shown at 70. Note that amplifiers 34 and 46 respectively are connected with reference level bus 70 from along lines 72 and 74, to bus 66 from line 71, and to bus 68 from lines 73 and 75.

When the control system is operated in its aperture mode to regulate an aperture mechanism, the output signal at common output terminal 56 represents the illumination on photovoltaic cell 32 as modified by aperture status and has a characteristic corresponding to one of the brightness curves 17 described earlier in connection with FIG. 2. This signal is also present at line 58, and is adjusted by a circuit arrangement shown generally at 76. Adjusting circuit 76 is a function generator and alters the signal such that it may function with a voltage-sensitive trigger circuit shown generally at 78 in accordance with a programmed triggering function.

Figure 4:
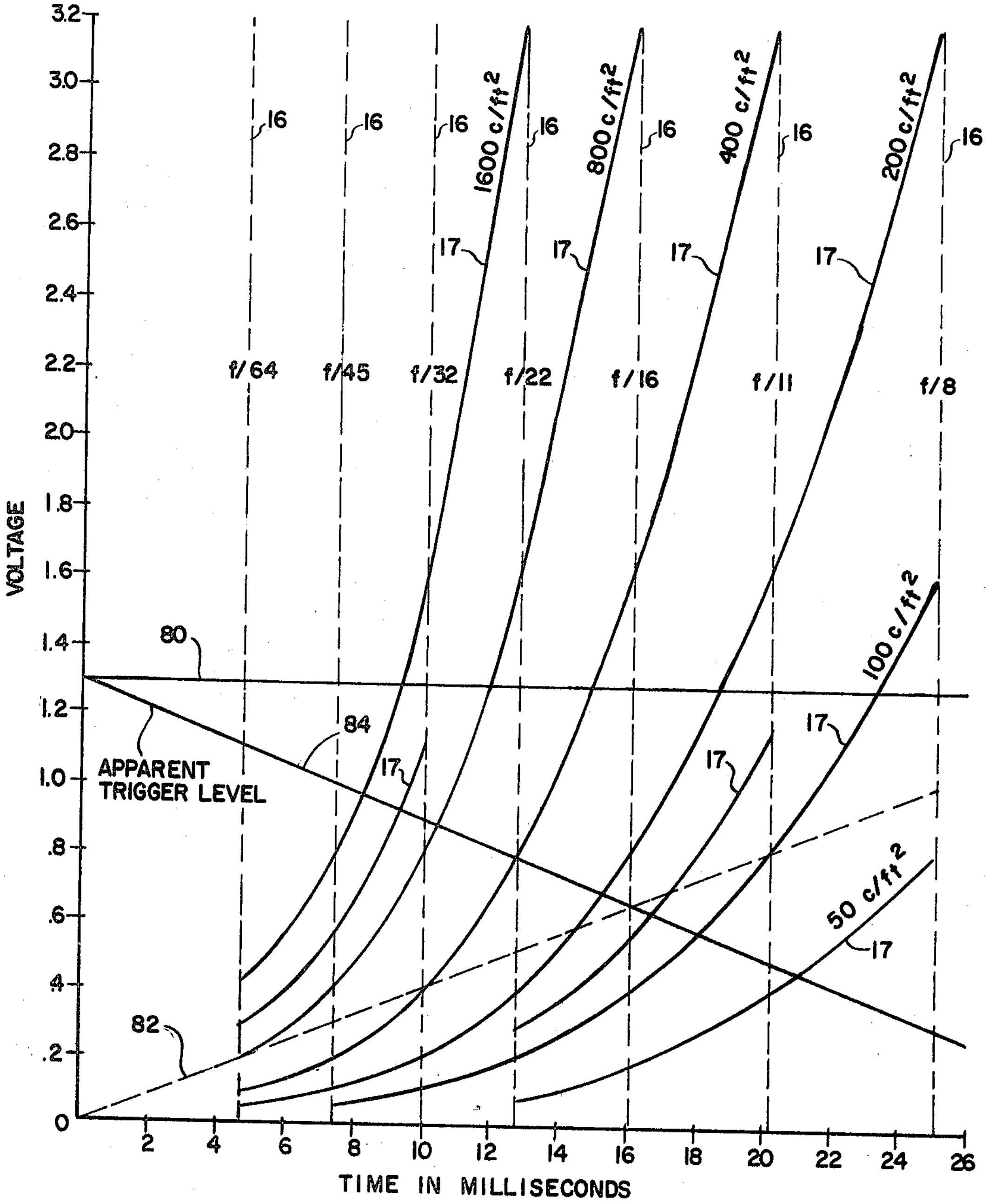
FIG. 4 is a reproduction of the chart illustrated at FIG. 2 depicting, however, the operation of the ramp voltage of the instant control system.

Referring to FIG. 4, the family of brightness curve 17 described earlier in connection with FIG. 2 are reproduced. Similarly, the vertical aperture identification lines 16 of FIG. 2 are superimposed over the family of brightness curves. The signal-adjusting circuit 76 influences aperture adjustment to cause the trigger circuit 78 to operate as if it has a reference triggering level corresponding to the adjusted trigger level defined by curve 22 in FIG. 2. Rather than undertake the complex adjustment of the trigger circuits' triggering level, trigger circuit 78 is provided with a constant triggering level identified at 80 in FIG. 4. To accommodate for this constant level, an increasing signal or ramp voltage is added to the brightness voltage function as depicted by the family of curves at 17. Such a ramp signal is shown in the figure as a sloping line function 82 progressing from 0 volts at 0 time to 1.0 volts at 25 ms. time. Signal 82 can be added point by point to all brightness curves 17 representing various light levels, but for construction purposes, its value may be subtracted from the constant trigger level curve 80. The resultant apparent trigger level is shown at 84. Analysis of trigger level 84 reveals that the intersections of this line by the brightness curves 17 define apertures substantially identical to the desired apertures represented in the adjusted trigger level curve 22 of FIG. 2.

The signal adjustment suggested by the graphic portrayal of FIG. 4 is accomplished in conjunction with the function generator circuit 76. As a prelude to the operation of that circuit, however, the brightness signal at line 58 is scaled to be capable of functioning with the triggering level or condition at trigger circuit 78. This level is generally about one-half of the voltage between bus 68 and bus 70. For the brightness signal from line 58 to be used in conjunction with trigger circuit 78, a DC level shift must be provided. In this regard, note that the output of amplifier 46 is at the ground reference level 70 and the triggering level for the trigger circuit 78 is at a voltage value substantially below the ground reference. To provide the requisite level shift, a pair of resistors $R_4$ and $R_5$ are incorporated in line 58 between common terminal 56 and bus 68. These resistors are chosen with resistance values such that a voltage is provided at a junction 84 between them which is substantially smaller than the triggering level established at the trigger circuit 78. With such an arrangement, a signal passing through the amplification stage 46 will go positive with respect to the ground and will appear in attenuated or scaled down form at junction 84. A line 86 couples the junction 84 with one side of a capacitor $C_1$, the other side of which is, in turn, coupled along line 88 to the input stage of trigger circuitry 78. Resistor $R_6$ is coupled between line 88 and bus 70 by line 90. A normally closed switch $S_3$ is coupled within a shunt path 92 extending across capacitor $C_1$. When switch $S_3$ is open, capacitor $C_1$ is charged through resistor $R_6$ by a signal representing an association or addition of the scaled brightness level signal and a ramp signal. It will be apparent that resistors $R_4$ and $R_5$ form part of the return path for the charging signal and that the charging signal through resistor $R_6$ is additive with respect to the brightness level signal at junction 84. To provide a proper addition of the above signals, the initiation of the charging sequence on capacitor $C_1$ must be coincident with the initiation of the scan of photocell 2. In effect, the output of circuit 76 is simulative of the time dependent dynamic characteristics of the aperture mechanism.

As an alternate arrangement, the resistor $R_6$ may be directly coupled with bus 66. Such coupling serves to isolate the charging of capacitor $C_1$ through $R_6$ from the functioning of resistors $R_4$ and $R_5$. The ramp charging of capacitor $C_1$ operates independently and would be continually present without the existence of the bypass switch $S_3$ which functions to coordinate the initiation of ramp charging with commencement of the scan of cell 32. Switch $S_3$ also functions to reset the capacitor $C_1$ for sequential operation.

The voltage buildup at capacitor $C_1$ is presented along line 88 to the input stage of trigger circuit 78.

Circuit 78 is of a voltage-sensitive variety which continuously energizes a circuit element such as the coil 94 of an electromagnet arrangement or the like until the receipt by the circuit of a predetermined output signal level from along line 88. The functional coupling of coil 94 with an aperture mechanism shown in block fashion at 200 is indicated by dashed linkage 201. At such time as the select signal level or condition is reached, for instance as suggested by level 80 in FIG. 4, the coil arrangement as at 94 is deenergized to cause the actuation of one component of the aperture mechanism 200. Circuit 78 will be recognized as a Schmitt-type trigger circuit which has an input that is a normally nonconducting stage formed of a transistor $Q_1$ having base, collector and emitter electrodes *96b*, *96c* and *96e*, respectively. Collector electrode *96c* of transistor $Q_1$ is connected to bus 70 of the power supply through line 98 and a biasing resistor $R_7$. Emitter electrode *96e* of transistor $Q_1$ is connected to bus 68 of the power supply through a biasing resistor $R_8$ on line 100. The normally conducting stage of circuit 78 includes a transistor $Q_2$ having base, collector and emitter electrodes, respectively, at *102b*, *102c* and *102e*. Electrode *102c* is connected to ground bus 70 through the coil 94 in line 104. Base electrode *102b* of transistor $Q_2$ is connected to collector electrode *96c* of transistor $Q_1$ through a lead 106, and the emitter electrode *102e* of transistor $Q_2$ is connected through a bias resistor $R_8$ in line 100 to bus 68. It may be noted that with the above arrangement there is essentially a common emitter resistor, the resistance value of which is selected for establishing the threshold voltage at which it is desired to trigger the circuit 78.

The coil 94 is energized by completion of a circuit from bus 70 through the coil 94 on line 104, through transistor $Q_2$, then through resistor $R_8$ on line 100 to bus 68.

Trigger circuit 78 is energized upon the closure of switch $S_1$ at the initiation of an exposure cycle. To permit the system to operate in an aperture regulating mode, switch $S_2$ is closed against terminal (a) and switch $S_3$ is opened simultaneously with the commencement of the earlier described scanning of photovoltaic cell 32. With the closing of switch $S_1$ the coil 94 of an electromagnet is energized as the transistor $Q_2$ assumes a conductive state, the base electrode *102b* thereof having been gated from resistor $R_7$ on line 98. Transistor $Q_2$ continues to conduct, thereby permitting the continued energization of the coil 94, until transistor $Q_1$ receives a triggering voltage, for instance at the level indicated at 80 in FIG. 4. As transistor $Q_1$ is triggered into conduction, the voltage at base *102b* falls below the necessary bias level for transistor $Q_2$ and coil 94 ceases to be energized. The deenergization of coil 94, in turn, functions to provide a braking function for the aperture mechanism 200 which serves to define an appropriate aperture. This status change at coil 94 also actuates a sequencing function for the operational modes of the exposure mechanism. Transistor $Q_1$ is coupled along line 88 for response to the voltage buildup at capacitor $C_1$. As discussed earlier, this buildup is adjusted through the insertion of a ramp signal so as to operate under a preselected program. When the voltage buildup at line 88 reaches a preselected value as indicted by level 80 in FIG. 4, the base-emitter junction of transistor $Q_1$ will be forward biased and its conduction will cause the above-described switching function. Those versed in the art will recognize that the common emitter coupling between transistors $Q_1$ and $Q_2$ in combination with resistor $R_8$ forms a regenerative arrangement for improving the sensitivity of the triggering circuit.

The control system of the invention operates in sequence to regulate first aperture mechanism 200 and then a shutter mechanism such as that functionally identified at block 300. At the commencement of shutter interval regulation, switch $S_2$ in line 44 is shifted to close against terminal (b). The exposure interval is initiated with opening of normally closed switch $S_4$. Switch $S_1$ remains closed throughout the exposure control cycle.

At the commencement of exposure interval timing, photocell 32 has been scanned by the aperture-regulating mechanism and the amount of scene light reaching it is attenuated in accordance with the automatically selected taking lens aperture setting. Accordingly, cell 32 generates an output signal which is responsive both to the earlier selected aperture and to the light level of the scene. This output signal is ultimately used to determine the exposure interval defined between the uncovering and covering of the exposure aperture by shutter mechanism 300. When operating in its shutter timing mode, the light-sensing circuit 30 incorporates a different feedback path which is inserted into the system at switch $S_2$. Closure of switch $S_2$ against terminal (b) inserts a feedback line 114 having a capacitor $C_2$. Line 114 is connected with a wiper arm 116 of variable resistor 117 coupled between amplifier output line 40 and reference level bus 70. To prevent charging of the capacitor $C_2$ before the commencement of exposure interval timing, a bypass line 118 within which is inserted a normally closed switch $S_4$ provides a shunt path around the capacitor. With the feedback arrangement shown, photovoltaic cell 32 is permitted to operate in a current mode, the current generated by the cell being limited substantially only by its own internal impedance. Under such loading, the photovoltaic cell 32 is capable of forming a desirable linear output.

With the feedback arrangement illustrated, any difference of potential supplied by the photovoltaic cell 32 across input leads 36 and 38 causes a voltage to be produced at feedback path line 114 of opposite polarity to the voltage at line 36 (or the output end of capacitor $C_2$). As a consequence, the feedback path provides a substantially instantaneous feedback signal of opposite polarity which serves to counteract any differential signal voltage impressed by the cell 32 across the input terminals 36 and 38. The relatively low signal voltages at the input of amplifier 34 which are present with the relatively low signal current deriving from photovoltaic cell 32 are acted upon by the correspondingly high gain characteristic of the amplifier. Thus, although the amplifier 34 has a very high input impedance, the photocell 32, when connected in the system described, experiences only a very low impedance. Therefore, the current output of the photovoltaic cell 32 is directed into the feedback path along line 44.

The potentiometer arrangement at 117 provides a trimming function for the exposure interval timing parameter. In this regard the wiper arm 116 may be arranged to be manually adjusted by a camera operator to insert a lighten or darken adjustment into the system. Inasmuch as the potentiometer 117 is inserted between the output line 40 and reference level 70, the voltage buildup at the output of the amplifier 34 will be varied in accordance with the position of wiper arm 116. The signal present at output 40 of the light-sensing circuit 30 is introduced through calibrating resistor $R_2$ into the second amplification stage 46. At stage 46, the gain of the signal is adjusted, as before, in accordance with the sensitometric properties of the film being used with the exposure control system. Note in this regard that the second amplification stage 46 functions in both operational modes of the control system. No alteration of the gain of stage 46 is needed between the sequences of aperture regulation and exposure timing. Generally, resistor $R_2$ is selected for calibrating the exposure interval control portion of the system. This control parameter is determined with respect to a previously automatically selected aperture opening and any minor variation in aperture from the program will be accommodated for by the calibrated exposure interval control. Accordingly, adequate exposure precision is maintained with the precise calibration of only the exposure interval parameter circuitry. This arrangement for controlling exposure interval with respect to previously determined aperture and with high precision is sometimes referred to as "gross and vernier" adjustment, the "vernier" adjustment corresponding with interval control and the "gross" adjustment corresponding to aperture setting control. For calibration, resistor $R_2$ may have a value accommodating any tolerances in sensitivity of photovoltaic cell 32, tolerances in the capacitance values of capacitor $C_2$ or in the exposure interval voltage-sensitive triggering circuitry.

The arrangement of resistors $R_2$ and $R_3$ in the circuit provides an ideal sensitometric adjustment and calibration system. When the resistors are associated with the differential amplifier in the arrangement illustrated, the gain, A, of amplifier 46 closely approximates the ratio of the resistance values $r_3$ and $r_2$ respectively for resistors $R_3$ and $R_2$, i.e., $A=r_3/r_2$. It will be observed, therefore, that the system may be calibrated with one resistor element, for instance $R_2$, and adjusted for film speed with the other, for instance $R_3$. Note that the gain, $A$, varies in direct proportion with the resistance of resistor $R_3$. Such direct proportioning greatly simplifies the selection of a resistor unit for use in adjusting the system for different film speeds. Inasmuch as the gain, $A$, varies inversely with the resistance value at $R_2$, that element may alternately be used for the film speed adjustment function while $R_3$ is used for system calibration.

From the second amplification stage 46, the light-responsive signal is directed from common output terminal 56 through line 60 for introduction to a voltage-sensitive trigger circuit depicted generally at 120. Inasmuch as trigger circuits 78 and 120 are driven from a single source, means must be provided to assure their energization in proper sequence. The sequencing of their operation is achieved by raising the voltage level required for firing trigger circuit 120. This level adjustment is accomplished by the insertion of a diode 122 in path 60. Diode 122 functions in conventional manner to drain off a portion of the voltage signal present in path 60. It is preferred that the diode 122 be of the solid-state silicon variety inasmuch as this form requires about a ½-volt threshold signal before assuming a substantially fully conductive state. A further consideration in the selection of the diode 122 resides in the dynamics involved in switching from an aperture-regulating mode to an exposure interval regulating mode in the system. For instance, switch $S_2$ may require about 3 milliseconds to move from terminal (a) to terminal (b). The rapid rise time characteristic of the charge on capacitor $C_1$ during this switching delay may represent such an excursion as to inadvertently cause the firing of trigger circuit 120.

Similar to circuit 78, voltage-sensitive trigger circuit 120 is of a variety which continuously energizes a circuit element such as the coil 124 of an electromagnet arrangement or the like until the receipt by the circuit of a signal of predetermined level from output 52 of the light-sensing and amplification function. At such time as the select signal level is reached, the coil arrangement as at 124 is deenergized to cause the termination of an exposure interval by shutter mechanism 300. The electromechanical linkage between coil 124 and shutter mechanism 300 is depicted at 301. Switching circuit 120 is formed as a transistorized Schmitt-type trigger circuit having an input that is a normally nonconducting stage. This stage includes a transistor $Q_3$ having base, collector and emitter electrodes 126*b*, 126*c* and 126*e*, respectively. Collector electrode 126*c* of transistor $Q_1$ is connected to bus 66 of the power supply through line 128 and a biasing resistor $R_{10}$. Emitter electrode 126*e* of transistor $Q_1$ is connected to ground or reference bus 70 through a biasing resistor $R_{11}$ in line 130. The normally conducting stage of circuit 120 includes a transistor $Q_4$ having base, collector and emitter electrodes, respectively, at 132*b*, 132*c* and 132*e*. Electrode 132*c* is connected to bus 66 through the coil 124. Accordingly, coil 124 is energized when transistor $Q_4$ assumes a conducting status. Base electrode 132*b* of transistor $Q_4$ is connected to collector electrode 126*c* of transistor $Q_3$ through lead 134, and emitter electrode 132*e* of transistor $Q_4$ is connected through bias resistor $R_{11}$ to ground bus 70. It may be noted that with the above arrangement there is essentially a common emitter resistor, the resistive value of which is selected for establishing the threshold voltage at which it is desired to trigger the circuit 120.

Similar to trigger circuit 78, circuit 120 is energized upon the closure of power supply switch $S_1$. With the insertion of power, coil 124 is energized as the transistor $Q_4$ assumes a conductive state, the base electrode 132*b* thereof having been gated from resistor $R_{10}$ on line 128. Transistor $Q_4$ continues to conduct, thereby permitting the continued energization of the coil 124 until transistor $Q_3$ receives a voltage at the preselected triggering level. As transistor $Q_3$ is triggered into conduction, the voltage at base 132*b* of transistor $Q_4$ falls below its conductive bias level, and coil 124 ceases to be energized. The deenergization of coil 124, in turn, functions to cause shutter mechanism 300 to terminate an exposure. When the voltage buildup at line 60 reaches a preselected value which forward biased the base-emitter junction of transistor $Q_3$, the latter begins to conduct and cause the above-described switching function. Those versed in the art will recognize that the common emitter coupling between transistors $Q_3$ and $Q_4$ in combination with the resistor $R_{11}$ forms a regenerative arrangement for improving the sensitivity of the triggering circuit.

Attention is now turned to the orientation within the control circuit of the two identical Schmitt-type trigger circuits 78 and 120. The symmetrical arrangement of these circuits across the power supply permits the establishment of the reference or ground level at bus 70 without the use of a tapped power supply. This form of power supply would otherwise be required for the operation of differential amplifier stages 34 and 46. The balance of ground level bus 70 between power buses 66 and 68 is maintained as long as transistors $Q_2$ and $Q_4$ are in a conductive state and the coils 94 and 124 respectively coupled with them are energized. During an exposure sequence, however, circuit 78 is triggered to deenergize coil 94 before circuit 120 is triggered. Without a form of compensation in circuit 78, the symmetrical arrangement between buses 66 and 68 will be interrupted and negate the reference level contribution of bus 70. To compensate for the change in state of coil 94 and transistor $Q_2$, a transistor $Q_5$ and resistor $R_{12}$ are coupled between ground bus 70 and bus 68 to form a bypass across coil 94 and transistor $Q_2$. Transistor $Q_5$ has base, emitter and collector electrodes, respectively at 136*b*, 136*e* and 136*c*. The base 136*b* of transistor $Q_5$ is coupled for response to the circuit path of coil 94, its collector electrode 136*c* is coupled to bus 70 and its emitter electrode 136*e* is coupled with resistor $R_{12}$ to bus 68. As elaborated upon below, the transistor $Q_5$ and resistor $R_{12}$ constitute an emitter-follower arrangement with the collector 108 of transistor $Q_4$.

To maintain transistor $Q_5$ in a nonconductive status during the energization of coil 94, a transistor $Q_7$ is inserted between bus 68 and bus 70. Transistor $Q_7$ has base, emitter and collector electrodes 110*b*, 110*e* and 110*c* respectively. Base 110*b* is coupled with the common emitter junction of transistors $Q_1$ and $Q_2$ at line 100. Collector 110*c* of transistor $Q_7$ is coupled along line 111 through resistor $R_{18}$ to bus 70. Emitter electrode 110*e* of transistor $Q_7$ is coupled along line 112 to bus 68. During the conduction of transistor $Q_2$, the base-emitter junction of transistor $Q_7$ will be forward biased permitting the transistor to assume a saturated status. This status, in turn, will derive a relatively low voltage at line 113. The low voltage along this line maintains transistor $Q_5$ in a nonconducting status. As the circuit 78 is triggered and coil 94 is deenergized, the voltage level at line 113 will begin to rise. This voltage is present at the base 126*b* of transistor $Q_5$. As it reaches an appropriate level, conduction will be permitted at the base-emitter junction of $Q_5$ to shunt current otherwise passing through coil 94 through the bypass circuit. A silicon transistor is recommended for use as transistor $Q_5$ inasmuch as its threshold operational characteristics permit it to remain inoperative during the normal conduction state of transistors $Q_2$ and $Q_7$. Resistor $R_{12}$ has a value somewhat equivalent to the resistance imposed at the coil 94.

As switch $S_1$ is closed to supply power to the entire circuitry, it is necessary that circuit 78 be in appropriate alignment such that transistor $Q_2$ will be immediately forward biased. Since the trigger circuit may assume a somewhat random status following an exposure, it is preferred to insert a means for aligning it concurrently with the closing of switch $S_1$. Such alignment is provided by a capacitor $C_3$ inserted between junction 84 and power bus 68. Capacitor $C_3$ will cause the input line 88 to base 96*b* of transistor $Q_1$ to be held momentarily at the minus potential of bus terminal 68. This will assure the presence of a forward bias at transistor $Q_2$.

Operational amplifiers such as depicted at 34 typically require the presence of a small biasing current at their input terminals in order to provide a more accurate and effective operation. In the present amplification arrangement, such a biasing current is purposely inserted into the input side of the amplifier 34 through an attenuation network indicated generally at 140. Network 140 includes resistors $R_{13}$, $R_{14}$ and $R_{15}$. Resistors $R_{13}$ and $R_{14}$ are coupled on line 142 extending between bus 70 and bus 66. Resistor $R_{15}$ is coupled from junction 144 between resistors $R_{13}$ and $R_{14}$ to line 44. The resistance values within network 140 are selected so as to insert a low threshold level bias current into the amplifier 34. Multiple resistors are used within the network in lieu of one large resistance inasmuch as the resistive value for such a singular unit would be impractical for the current levels of the present circuit. The insertion of a low bias current is effective to broaden photosensitive characteristics of the exposure control system. Since the photovoltaic cell 32 may be called upon to detect very low light levels, the biasing current inserted by the network will permit substantially all of the signal current generated by the photocell 32 to be inserted into the feedback path of amplifier 34. Without the biasing current supplied by the network, such very low level signals would be drawn to the amplifier rather than the feedback path.

The circuit arrangement thus far described provides automatic exposure control under ambient illumination. For transient scene illumination, such as that supplied by flashbulbs and the like, an auxiliary timing network is incorporated within the circuit in supplement with the ambient mode circuit. This network is indicated generally at 150. The control system circuit is prepared for making a flash exposure by manually setting switch $S_6$ to a closed position against terminal (b). Switch $S_6$ is connected within line 152 between power supply buses 66 and 68. Connected in series with switch $S_6$ is a flashbulb or the like 154.

In a preferred embodiment of the control system of the invention, aperture mechanism 200 includes a "follow-focus" adjustment wherein the relative aperture selected for any flash exposure is determined on a flash source-to-subject distance. This approach fundamentally is based upon an application of the inverse square law for light energy propagation. Under this law, the light energy available from a given source is considered to vary inversely with the square of the distance from that source. Aperture mechanism 200, therefore, includes means for halting the opening movement of the aperture mechanism in accordance with a follow-focus arrangement, i.e., with respect to the light levels anticipated at the scene to be photographed. Following this initial adjustment, network 150, operating in conjunction with trigger circuit 120, causes shutter mechanism 300 to close at least at the termination of a predetermined fixed exposure interval.

The fixed exposure interval provided by the network 150 is selected to permit the shutter to remain open, for instance, over the light-generating period of a flashbulb. Under more normal conditions of flash illumination, the exposure interval is terminated by the photosensing circuit of the control system before the time period defined by network 150 is reached, hence the term "auxiliary timing network" 150. Since photovoltaic cell 32 senses ambient as well as artificial illumination, the control system of the invention is capable of providing a "fill-in flash" function particularly useful in outdoor photography.

Figure 5:
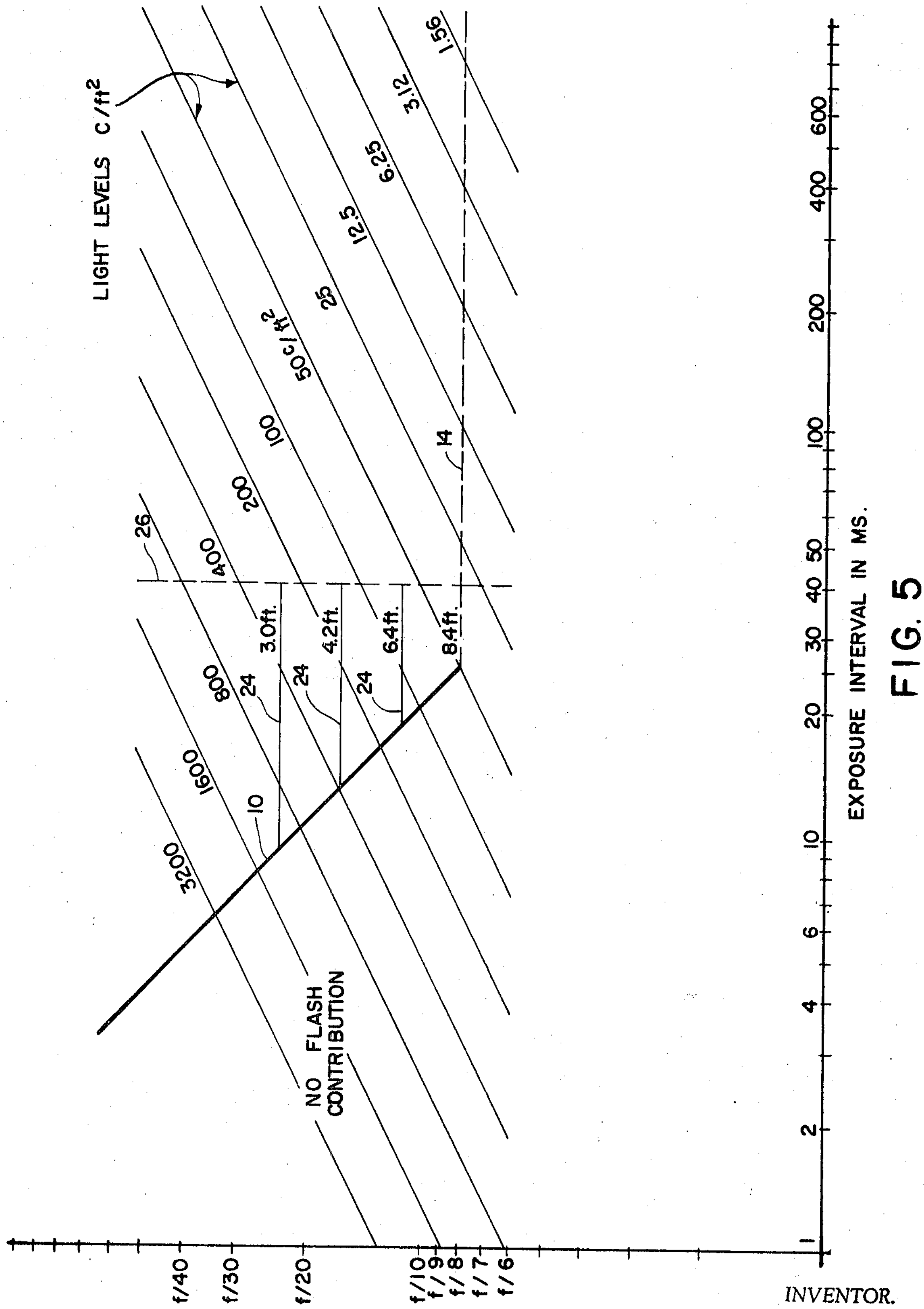
FIG. 5 illustrates an exposure control program according to the invention as a graph-relating aperture and exposure interval in log-log scale and depicting the flash mode operation of the program in relation to ambient and/or transient light levels for a particular film speed.

The effect of a "follow-focus" adjustment of aperture and of the fixed exposure interval provided by the auxiliary timing network 150 is illustrated in connection with FIG. 5. In that figure, sloping program line 10 is reproduced from FIG. 1 as well as its dashed horizontal extension 14 and a family of light level curves. The aperture mechanism with which the control system operates progressively enlarges the aperture opening from a minimum terminal or initial position to a maximum terminal position. Where "follow-focus" aperture adjustment is provided, a stop or the like mechanically halts aperture opening movement at a preselected position. This position may be mechanically established by the camera operator. The system, however, is capable of arresting the progressively opening aperture at a position defining an aperture having an area less than that defined by a preselected follow-focus aperture selection. This situation obtains when ambient scene lighting levels are sufficiently high. Limiting follow-focus aperture settings which may be inserted into the mechanism are indicated by exemplary horizontal lines 24. To the left and above the highest *f*/numbered lines 24, the exposure program line 10 represents the exposure parameters wherein the aperture halts or clamps as above noted, before reaching any one of the follow-focus horizontal settings 24. In such instance, the exposure control system regulates aperture and time according to the program of FIG. 1. In these situations, the shutter mechanism opens and closes to define an exposure interval before the illumination of flashbulb 154 has any effect over and above ambient illumination.

On the right side of programing line 10 the aperture will be regulated along one of the preselected horizontal program lines 24. In this zone, the aperture is fixed at 24 and only the exposure interval parameter is varied. Within this portion of the program, both transient, i.e., flash, and ambient illumination may have contributing effects on the determination of the exposure interval parameter. Accordingly, the system is capable of providing a "fill-in flash" function.

Auxiliary timing network 150 imposes a preselected fixed time interval over the normal functioning of the photosensing circuitry 30. This interval may be selected as at about 40 milliseconds and is indicated by the vertical dashed line 26. The time interval defined by line 26 may be selected as representing a period over which substantially all of the light energy of a flashbulb is expended. The network is energized simultaneously with the firing or ignition of flashbulb 154.

Figure 6:
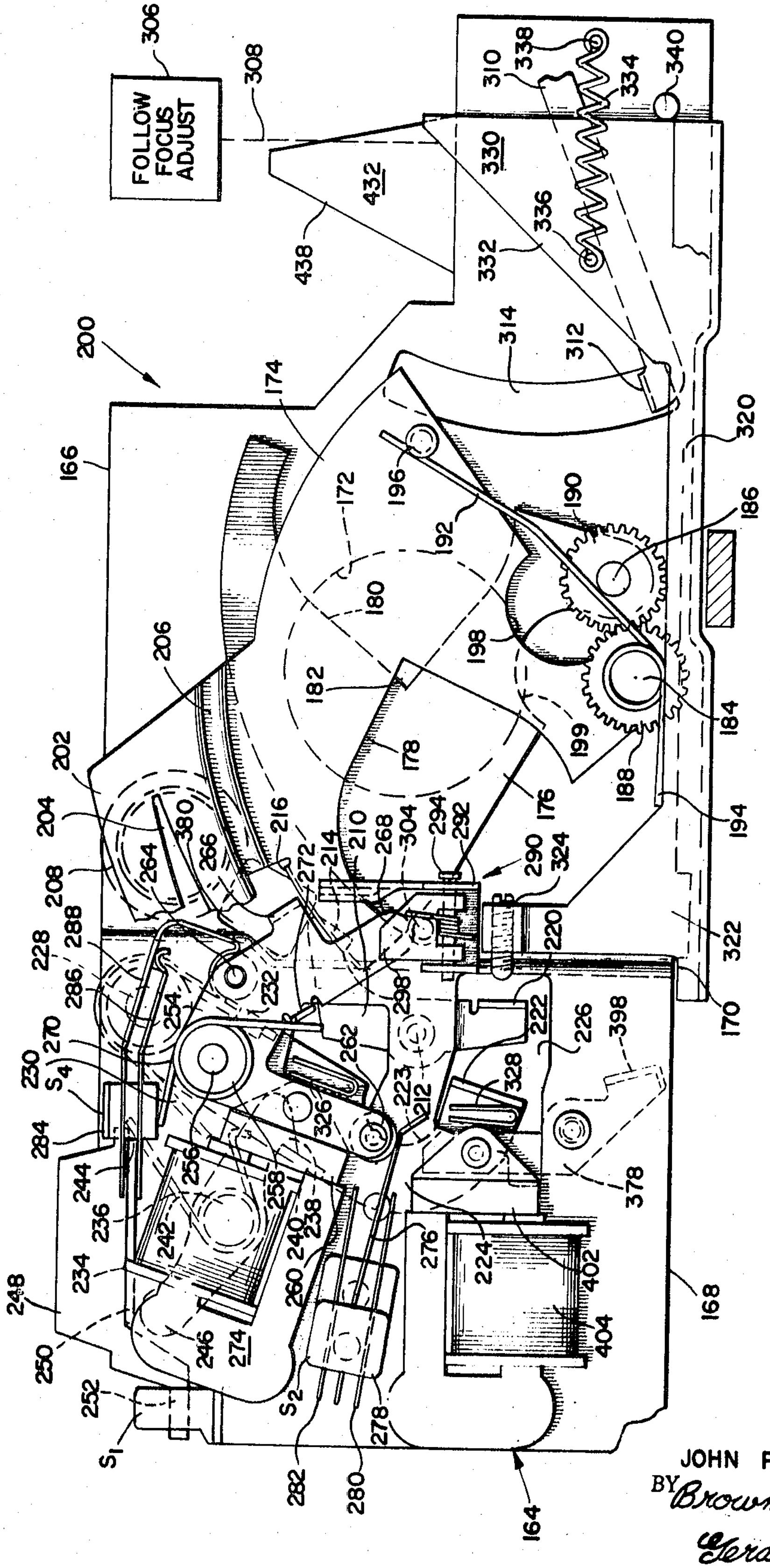
FIG. 6 is a diagrammatic, plan view of the aperture control assembly of an exposure mechanism according to the present invention, the various elements of the aperture-regulating arrangement being shown in a preexposure or cocked position.

Returning to FIG. 3, as discussed earlier, the present control system operates sequentially in one exposure parameter mode and then another. To change from one mode to the other, certain mechanical activity is required. For instance, switch $S_2$ is moved from contact against terminal (a) to contact with terminal (b). Somewhat simultaneously, the aperture-clamping mechanism 200, having established an appropriate aperture setting, mechanically causes the shutter mechanism 300 to uncover the aperture of the lens system. The portion of aperture mechanism 200 which causes the latter function is actuated as a result of the triggering of circuit 78 and consequent deenergization of coil 94. For the control system to operate with flashbulb illumination, this same triggering function must be performed. Under conditions of illumination wherein program line 10 of FIG. 1 and 6 is not followed, capacitor $C_1$ is called upon to fire trigger circuit 78 after an interval permitting aperture mechanism 200 to achieve a substantially full aperture opening, or about 25 milliseconds. Capacitor $C_1$ is charged to an appropriate triggering voltage by the earlier discussed ramp signal through line 90 and resistor $R_6$. Resistor $R_6$ and capacitor $C_1$ are linked to form an R-C timing circuit, the voltage buildup from which is presented across the base-emitter junction of transistor $Q_1$ to trigger circuit 78. For flash photography, the light levels of typical indoor scenes may be too low to influence the charge buildup at capacitor $C_1$ from light-sensing circuit 30. At the commencement of a flash exposure, therefore, switch $S_1$ is closed by a shutter release button to energize the circuit and cause capacitor $C_1$ to be charged through resistor $R_6$ when $S_3$ is opened. At the same time, the aperture mechanism 200 is mechanically regulated in accordance with a previously inserted follow-focus aperture selection. As capacitor $C_1$ reaches the triggering voltage of circuit 78, the circuit 78 is fired and coil 94 is deenergized. As coil 94 is deenergized, means are provided for causing shutter mechanism 300 to commence an exposure. Simultaneously, a normally open switch, $S_5$, coupled in series with switch $S_6$ on line 152, is closed to cause the firing of flashbulb 154. The closing of switch $S_5$ also energizes the auxiliary timing network 150. Under most conditions of flash mode operation, the electronic control circuit of the invention functions as described above in response to the illumination of flash bulb 154 and to film speed (as inserted at resistor $R_3$) to cause shutter mechanism 300 to terminate an exposure before the bulb has generated its total light-forming capacity. Should this not be the case, auxiliary network 150 functions to cause shutter mechanism 300 to terminate the exposure following a select exposure interval, for instance 40 milliseconds.

Auxiliary timing network 150 includes an R-C timing-integrating arrangement including a resistor $R_{16}$ and capacitor $C_4$ coupled between line 152 and bus 70 with lines 156 and 157. At the junction between resistor $R_{16}$ and capacitor $C_4$, a line 158 is connected extending from line 156 to a transistor $Q_6$. Transistor $Q_6$ is shown having base, collector and emitter electrodes respectively at **160*b*, 160*c* and 160*e*. Base 160*b* is coupled with line 158. Collector electrode 160*c* is coupled along line 162 to line 157 and emitter electrode 160*e* is coupled with line 60 and, therefore, with the base 126*b*** of transistor $Q_3$.

The timing network 150 is energized as switch $S_5$ is closed and flash 154 is energized. As this occurs, the capacitor $C_4$ is charged through resistor $R_{16}$. The resultant voltage buildup is presented across the base-emitter junction of the transistor $Q_6$ and as it reaches a preselected triggering level, transistor $Q_6$ is forward biased to fire triggering circuit 120 through a conductive path including line 152 and input line 60. Upon receipt of a triggering signal, the circuit 120 functions as earlier described to cause shutter mechanism 300 to terminate an exposure. A resistor $R_{17}$ is inserted in line 152 between its junction with line 157 and flashbulb connection 154 to function as a limiting resistor. When flash 154 is fired, the current drains occasioned through the flash circuit are limited by resistor $R_{17}$ to a value such that the internal impedance drop in battery 64 is not so great as to cause an inadvertent firing of trigger circuit 120.

THE EXPOSURE MECHANISM

The exposure mechanism which is regulated by the above-described control circuit of the invention has heretofore been illustrated only functionally as at 200 and 300 in FIG. 3 of the drawings. The mechanism preferably cooperates within the control system to first regulate the aperture in a continuously variable fashion between terminal positions representing minimum and maximum aperture openings and, in sequence, provide a means for covering and uncovering the aperture for a period of time representing the exposure interval. In performing these sequential functions, the regulation of aperture and exposure interval should be interrelated to conform with an exposure program as discussed in connection with FIG. 1.

In the description to follow, a mechanism operable with the control system of the invention is discussed in the order of its sequence of operation. The mechanical arrangements for performing aperture determination and exposure interval control are mounted on opposite sides of a common baseplate. Certain components of the exposure mechanism function in common with both modes of regulation. Consequently, they appear in dotted form in certain of the drawings and in solid line form in drawings representing the opposite side of the baseplate. Following a description of the structure of both of the regulating mechanisms, their operation in conjunction with the circuit of FIG. 3 is detailed.

APERTURE MECHANISM

Figure 7:
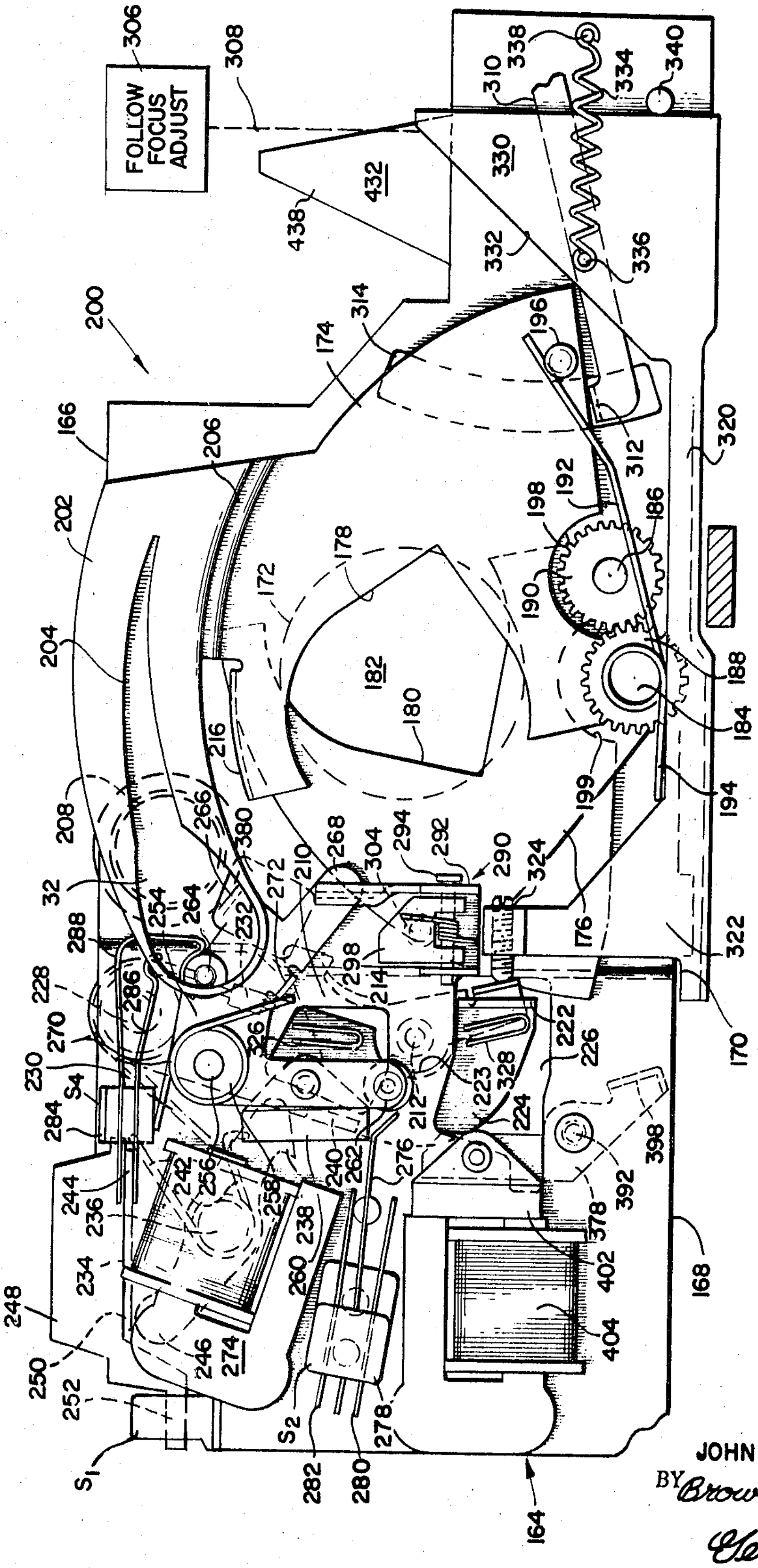
FIG. 7 is a diagrammatic, plan view of the aperture control assembly of FIG. 6 showing the positions of the various elements of the assembly during an exposure sequence.

Referring to FIGS. 6 and 7, an aperture-regulating mechanism is illustrated respectively in an orientation wherein the aperture blades are cocked in readiness for an exposure, and at a point in time following the commencement of an exposure cycle when an appropriate aperture has been defined.

Mechanism 200 "scans" or alters the amount of scene light reaching a photovoltaic cell in synchronism and corresponding variation with a rapid and continual adjustment of aperture size. This adjustment is halted as the blades reach a position determined in accordance with the amount of scene light reaching the photovoltaic cell as related to an exposure control program.

The regulating mechanism includes a camera baseplate depicted generally at 164. Baseplate 164 is formed in stepped fashion having two principal levels 166 and 168. Levels 166 and 168 meet and are joined at a riser arrangement represented at 170. The elevational difference between base portions 166 and 168 is minimal, basically serving to accommodate the above-mentioned elements which are common to both aperture and shutter modes of operation. For purposes of facilitating an understanding of the difference of elevations of base 164, in FIG. 6, portion 168 may be considered to be higher than portion 166. The baseplate 164 is formed having a circular opening 172 coaxially aligned with the optical axis of the camera within which the aperture-regulating mechanism is situated. Opening 172 is typically dimensioned having a diameter at least coextensive with the maximum aperture adjustment of the optical system. Aperture adjustment over the opening 172 is provided by a diaphragm arrangement formed of two aperture-defining blades 174 and 176. Formed of planar, opaque material, each of the blades 174 and 176 has selectively contoured indentations or notches, the edges of which are shown respectively at 178 and 180. The notches within each blade are shaped and arranged to cooperate when overlapped to define an aperture opening 182 formed about the optical axis of the camera lens system. Blades 174 and 176 are mounted for rotation upon the baseplate 164 at pivot studs respectively shown at 184 and 186 which extend into and are supported by base portion 166. To provide a coaction between each of the aperture blades, externally meshing spur gears 188 and 190 are journaled respectively over shafts 184 and 186 and fixed to blades 174 and 176. The spur gears 188 and 190 permit a uniform synchronous and relative coaction between the aperture forming blades 174 and 176. Inasmuch as the aperture blades are linked for mutually opposed rotation through gears 188 and 190, only one of the blades need be driven to impart rotation to both. Accordingly, a singular wire blade loading spring 192 is mounted within the assembly having a stationary end 194 fixed to the base portion 166 and a flexed transitional end positioned in biasing relationship against aperture spring stud 196 secured to the surface of blade 174. The rotational force exerted by spring 192 to blade 174 serves to impose a corresponding oppositely directed rotational force upon blade 176 through the geared mechanical linkage between the blades. In the terminal or cocked position of the blades depicted in FIG. 6, a minimum aperture which the blades are called upon to define is present. To provide for adequate translational rotation of the aperture blades from this minimum aperture position while maintaining structural compactness, semicircular indentations are formed respectively within the blades 174 and 176 at 198 and 199.

A further examination of the shape of aperture blade 174 reveals an outwardly extending flange portion or vane 202 within which is formed an elongate opening 204. Flange portion 202 is beveled inwardly at 206 such that its rear surface passes in relatively close proximity to an annular mounting 208 configured to retain a light-sensing element such as photovoltaic cell 32 of the light-sensitive circuit 30. Photovoltaic cell 32 is positioned within mounting 208 in an outward orientation permitting it to witness scene illumination. This photovoltaic cell arrangement is mounted with respect to the flange portion 202 such that the amount of scene light which it receives is regulated by the area of the elongate opening 204 presented before it at any given time during an exposure sequence. Elongated slot 204 is selectively dimensioned for attenuating light reaching a photocell at 208 in correspondence with the aperture-defining position of the blades 174 and 176. With such a scanning arrangement the control circuit of the invention may be made responsive to relative aperture and scene light during an exposure sequence.

The coacting aperture blades are held in the cocked or initial terminal position illustrated in FIG. 6 by a release latch 210. Positioned upon the opposite side of base portion 168, the latch 210 is mounted for rotation about a pivotal stud 212 fixed to the baseplate. The latch has a latching tip 214, extendable through an opening in riser 170, and which releasably engages blade 174 by virtue of its insertion within a slot positioned in an inwardly bent flange 216 formed in the upward edge of blade 174. The release latch 210 is biased for rotation toward the aperture blades by a wire spring 218 (FIG. 10) slidably wound about shaft 212 and having one end fixed to base portion 168 and the opposite end configured to hook about the body of latch 210. The biased rotational travel of the latch member 210 is limited by the opening in riser 170 through which its tip 214 passes. Release latch 210 is additionally configured having an outwardly extending flange portion 220 formed in its extension below stud 212.

Release latch 210 is mounted upon the outward side of the base portion 168 in a position suitable for the cooperation of its extended flange portion 220 with a similar flange 222 extending inwardly and formed upon the tip of a loading arm 224. Note that flanges 220 and 222 extend through an opening 226 in the base portion 168. Positioned on the opposite side of base portion 168, the loading arm 224 is pivotally mounted upon a pivot bushing or stud 228 extending outwardly from the base. Loading arm 224 is biased for movement toward latch 210 by a wire spring 230 wound about pivotal mount 228, having its transitional end fixed to a tab 232 and its opposite end held stationary by abutment against tab 233 fixed to base 168. The arm 224 has a semicircular notch 223 for permitting its flange portion 222 to move under pivot stud 212 of latch 210. As illustrated in dashed line fashion in FIG. 6, loading arm 224 is held prior to exposure in a retracted position by a second release latch 234. Latch 234 is pivotally mounted upon a stud 236 fixed, in turn, to the opposite side of base 164. The latch has a latching tip 238 configured and arranged to engage a tab 240 extending outwardly from the rear side of loading arm 224. Latch 234 is biased for rotation toward engagement with tab 240 by a wire spring 242. Spring 242 abuts at one side against a portion of the release button 248 at 244 and at a transitional side hooks over the upward edge of arm 234.

The upward edge of arm 234 is additionally shaped to include a circular cam surface 246 which is configured and arranged for cooperation with a release button 248 attached to a release bracket 250. Release button 248 is biased upwardly by abutment against one end of spring 242. Release bracket 250 of the release button 248 is linked with a normally open leaf spring indicated generally at $S_1$. This linkage depicted generally at 252 causes normally open switch $S_1$ to close upon the manual depression of button 248. A detailed description of switch mechanism $S_1$ will be found in copending, commonly owned application for Pat. Ser. No. 837,672 by Lawrence M. Douglas, entitled "Photographic Exposure Control System with Automatic Cocking Mechanism" filed concurrently herewith.

Figure 10:
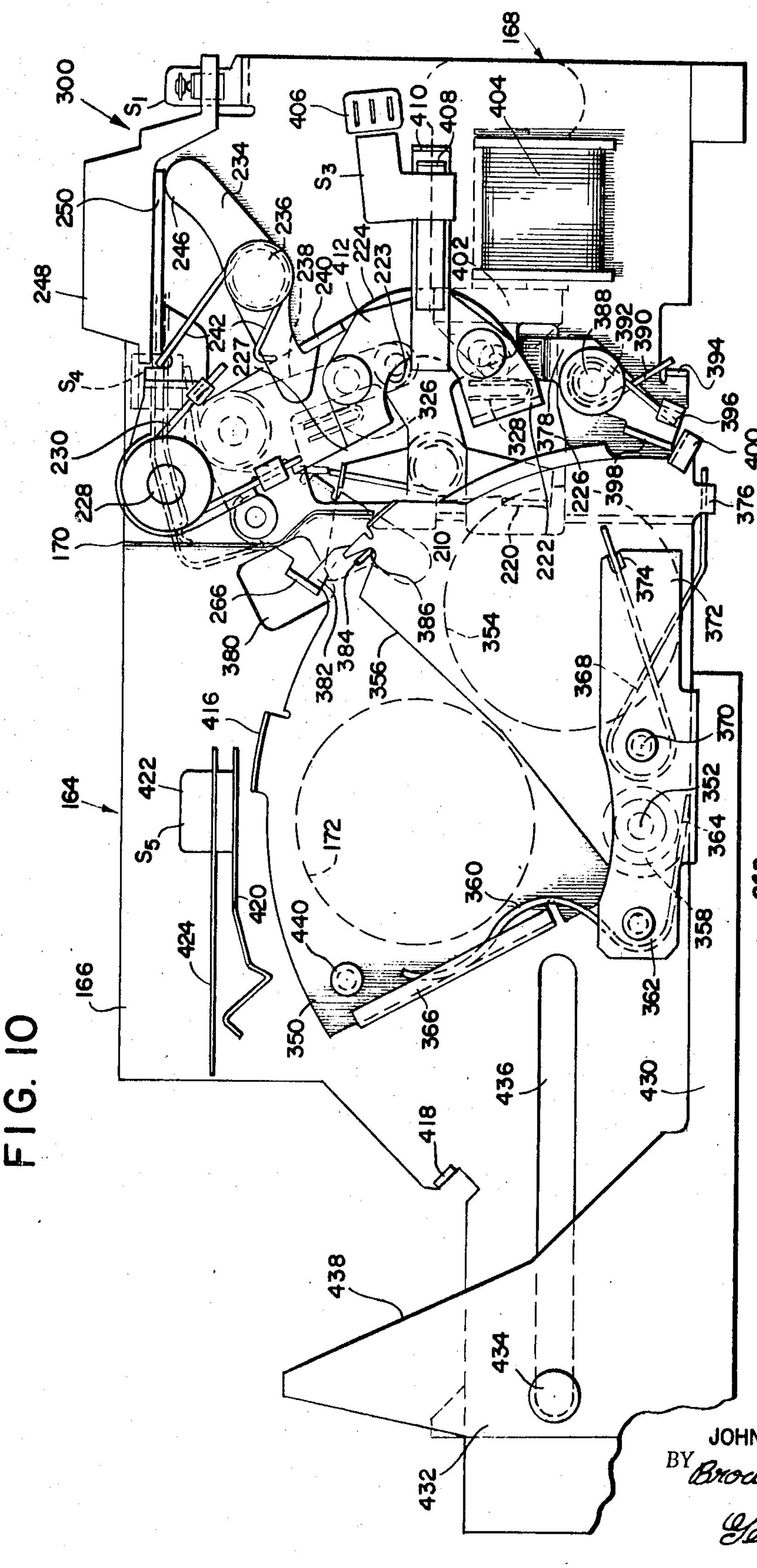
FIG. 10 is a diagrammatic, plan view of an exposure mechanism according to the invention showing shutter assembly elements for use with the control system of the invention, the various elements of the shutter assembly being shown in an initial preexposure or cocked position.
Figure 11:
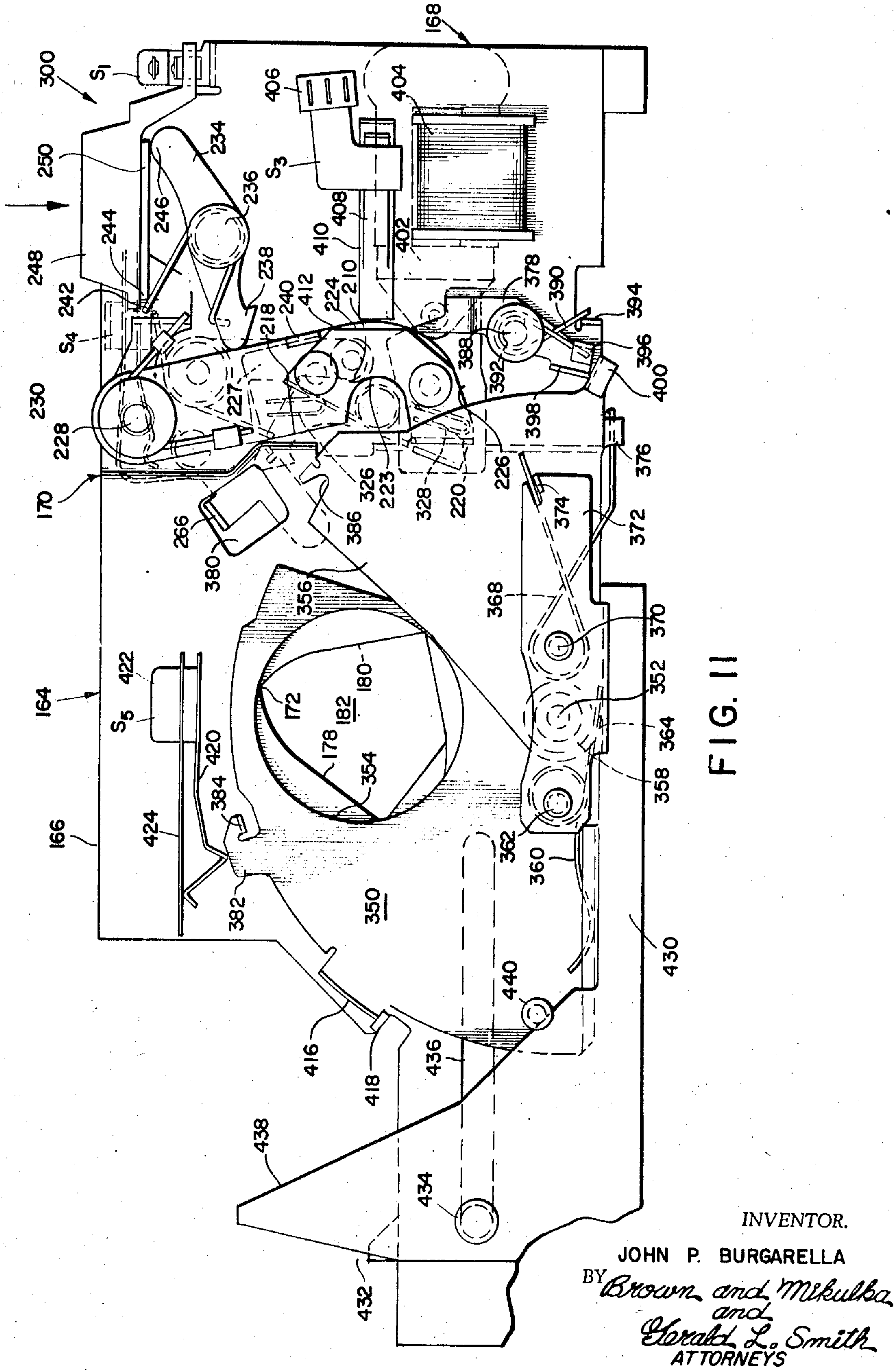
FIG. 11 is a diagrammatic, plan view of the shutter assembly of FIG. 10 showing the positions of the various elements of the shutter during an exposure interval.

The configurations of latches 210, 234 and loading arm 224 as well as their associated mountings are illustrated in FIGS. 10 and 11 as well as the presently discussed FIGS. 6 and 7.

From the foregoing description it will be apparent that as release button 248 is depressed, it cams against the camming edge 246 of release latch 234 imparting rotation to it against the bias of spring 242. This rotation results in the release of tip 238 of the latch from engagement with tab 240 on loading arm 224. This release of loading arm 224 permits its spring-loaded rotation, to cause its flange tip 222 to strike the corresponding flange 220 of aperture blade release latch 210. The resultant impact rotates latch 210 in a direction causing its latching tip 214 to disengage from flange 216 of aperture blade 174. Aperture blades 174 and 176 then rotate under the bias of spring 192 to define a gradually enlarging aperture opening 182. The resultant orientation of the above-described elements is portrayed in connection with FIG. 7.

Positioned on the aperture blade side of base 164 is a changeover arm 254 configured generally as an inverted "v". Arm 254 is pivotally mounted upon a stud 256 and rotatably secured by a retainer ring 258. One leg of the changeover arm is configured and dimensioned for pivotally supporting at about its midpoint a magnetizable keeper 260 and, at its tip, an electrically insulative cylindrical bearing member 262. The opposite side of changeover arm 254 has an electrically insulative cylindrical bearing member 264, an inwardly extending flange or tab 266 and a circular camming tip at 268. Flange 266 extends through a rectangular opening 380 in baseplate portion 166 for the performance of an exposure control function on the opposite side of the assembly. A rotational bias is imparted to the changeover arm 254 by a wire spring 270, a transitional end of which abuts against a tab 272 and a stationary end of which abuts against the housing 284 of a switch member $S_4$ mounted upon baseplate 164.

In the exposure status of the mechanism depicted in connection with FIG. 6, the changeover arm 254 is oriented to position magnetizable keeper 260 in abutting contact against the pole of an electromagnet 274 fixed, in turn, to base portion 168. Electromagnet 274 incorporates, as one component, the coil 94 discussed in connection with FIG. 3 of the drawings. Cylindrical bearing member 262 on the changeover arm is positioned in operative relationship with the common contact member 276 of a dual terminal switch $S_2$. Switch $S_2$ includes an insulative supporting base 278 mounted upon base portion 168. The switch is formed having lower and upper contacts 280 and 282 corresponding respectively with terminals (a) and (b) of switch $S_2$ in the circuit of FIG. 3.

Cylindrical bearing member 264 in the opposite leg of changeover arm 254 is arranged for operative association with a switch generally indicated at $S_4$ mounted upon base 164. Switch $S_4$ includes an insulative supporting base 284 from which extends resilient and normally contacting leaves 286 and 288. The rotation of changeover arm 254 about its pivot 256 causes the bearing member 264 to move upwardly against leaf member 288 and break its normal contact with leaf 286.

A consideration of the configuration and mutual interlinkage of the aperture blades 174 and 176 reveals that the blades define a continuously variable aperture rather than an incremental or stepped motion as they separate under the bias of spring 192. To halt the motion of the blades at an appropriate aperture, a mechanical brake arrangement shown generally at 290 is mounted within the exposure mechanism. Since the aperture blades are mutually linked by gears 188 and 190, the brake arrangement 290 need work with only one of the blades, for instance blade 176. The braking system is fully described and illustrated in a copending application for U.S. Pat., Ser. No. 784,064 by Lawrence M. Douglas and entitled, "Aperture-Defining Exposure Control System," filed Dec. 16, 1968.

Figures 8, 9:
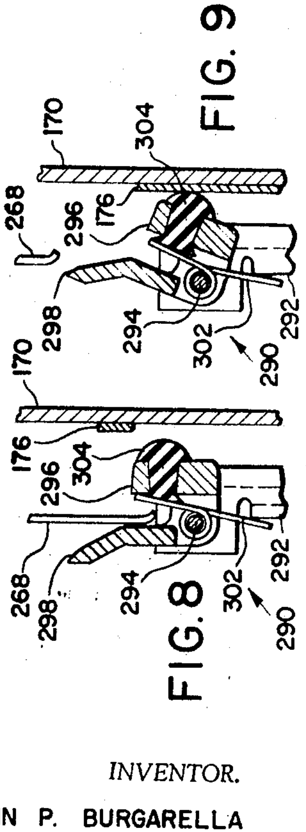
FIG. 8 is an enlarged fragmentary view showing a segment of the braking mechanism illustrated in FIGS. 6 and 7.
FIG. 9 is the fragmentary view illustrated in FIG. 8 showing, however, the orientation of the braking structure during an aperture blade braking procedure.

Referring to FIGS. 6 and 8, brake arrangement 290 is illustrated in an orientation permitting the free pivotal movement of the aperture blades 274 and 276. The brake comprises a mounting structure 292 fixed to the exposure mechanism and configured to position the braking elements of the arrangement a select distance from the surface of aperture blade 176. Mounting structure 292 supports an axle 294 in a plane parallel to the surface of aperture blade 276. Pivotally mounted upon axle 294 is a braking member formed having a lever portion 296 extending from axle 294 towards the surface of blade 176 and integrally connected retracting portion 298 extending oppositely therefrom.

Lever portion 296 is of a length greater than the selected distance from axle 294 to the surface of blade 176. A central opening is formed within the braking member to permit the insertion of a wire spring 302. Spring 302 biases lever portion 296 towards the surface of aperture blade 176. Toward the outer tip portion of lever portion 296 an opening is formed in the braking member which retains a cylindrically shaped insert 304 formed of a brakeshoe type of material having a relatively higher coefficient of kinetic friction with respect to the material from which the blade 176 is formed. The insert surface of lever portion 296 is held away from the surface of aperture blade 176 as a result of the downward pressure exerted by the tip 268 of changeover arm 254. An upward rotation of the changeover arm, however, releases the downward pressure exerted by tip 268, permitting the lever portion 296 to pivot about axis 294 into contact with blade 176, thereby arresting its motion to define a select aperture. The resultant orientation of the components of the brake arrangement following its release is illustrated in connection with FIGS. 7 and 9.

As discussed in connection with the auxiliary timing network in FIG. 3, where the control system is operated in a flash or transient illumination mode, it is preferred that the aperture mechanism 200 include a "follow-focus" adjustment. With such adjustment, the relative aperture selected for any flash exposure is determined on a flash source-to-subject distance. The system for determining such appropriate adjustment is indicated functionally in FIGS. 6 and 7 at 306. This adjustment 306 cooperates through a mechanical linkage indicated generally at 308 with a travel-limiting lever 310 shown in partially broken away fashion. Lever 310 has an inwardly depending flange or tab portion 312 which rides within a slot 314 situated in the base portion 166. By adjusting the orientation of tab 312 within slot 314, the maximum extent of opening of aperture blades 174 and 176 may be established. During ambient illumination exposure procedures, the lever 310 is pivoted to a position wherein no illumination is imposed upon the aperture blade travel.

FIGS. 6 and 7 further disclose a portion of a cocking mechanism for the control system. The mechanism includes a cocking ram formed having a stem portion 320 terminating in an upstanding tip portion 322. Tip 322 is configured to retain an oval point setscrew 324 which is positioned at an elevation permitting its contact with flange 222 of loading arm 224. Tip 324 is arranged upon the base assembly such that it will bypass the flange 220 of latch 210 when moved from right to left in the orientation of the drawings. The cocking function also includes two U-shaped spring members 326 and 328 the curved portions of which are fixed to the surface of loading arm 224. Spring 328 protrudes through and moves within opening 226 in base portion 168 while spring member 326 protrudes through and moves within opening 227 in the baseplate. The spring members are arranged such that their resilient tines contact the keeper members associated with the electromagnets of the system and urge them into appropriate preexposure position when the loading arm 224 is rotated by the ram member in a clockwise direction. The spring arrangement provided with the recocking assembly accommodates for any overtravel of the ram assembly thereby protecting the magnetic device and related mechanisms.

At the opposite end of stem portion 320 there is provided an upstanding blade return member 330 having a canted edge portion 322 configured for camming against stud 196 of blade 174. As camming edge 332 is pushed against stud 196, blade 174 is urged to rotate in a counterclockwise direction to the extent that the slot in its flange 216 reengages the latching tip 214 of latch 210. The cocking ram is biased toward a standby position by virtue of a coil spring 334 tensioned between a pin 336 fixed to member 330 and a pin 338 fixed to baseplate 164. A stud 340 is fixed to base 164 for purposes of limiting the return motion of the cocking ram.

SHUTTER MECHANISM

Following the automatic determination of aperture as discussed in connection with FIGS. 6 through 9, the control system automatically controls exposure interval. This control may be provided by a shutter mechanism as portrayed in FIGS. 10 through 12. Of these figures, FIGS. 10 and 11 represent a rear view of select portions of the aperture regulation instrumentation discussed in connection with FIGS. 6 and 7. In this regard, such element of the mechanism as the loading arm 224, release latch 234, aperture blade release latch 210, release button 248 and select portions of switch $S_4$ and changeover arm 254 are viewed from an opposite direction. In FIG. 10 the shutter mechanism is shown in a cocked, preexposure orientation, while in FIG. 11 the shutter mechanism is depicted in a status assumed during an exposure interval.

The shutter mechanism portrayed in the figures is one of a variety utilizing a pair of opaque, planar shutter blades. These blades sequentially uncover and cover the optical path or exposure aperture of a camera. At the commencement of an exposure interval a first of these blades, termed the "opening blade," moves to a position causing the unblocking of the optical path of the camera. Following an appropriately timed interval of exposure, a second blade termed the "closing blade," is released for movement to a position causing a covering of the optical path. An exposure interval is derived as the time elapsed between the opening and closing of the shutter blades and is controlled by the timed release of the closing blade in accordance with the control system program.

The opening blade of the shutter assembly is illustrated at 350 and is configured as a wedge-shaped segment of a circle, the apex of the wedge being mounted for rotation about a pivotal stud 352 depending from baseplate portion 166. As illustrated in the cocked portrayal of the shutter mechanism of FIG. 6, blade 350 has a planar opaque portion extensible over the opening 172 of the camera optical path. The planar face of opening blade 350 also has an annular opening 354 of equal diameter with opening 172. Openings 172 and 354 are oriented with equal radial spacing from the pivot at stud 352. Positioned over and mounted coaxially with the opening blade 350 is a planar opaque closing blade 356 configured coradially with the outward edge of blade 350 and having a surface area sufficient to occlude light passing through opening 172 when it is rotated into appropriate position. A retainer ring 358 is positioned over stud 352 to maintain the blades in position thereupon.

With the configuration described, the blades 350 and 356 selectively occlude light passing through optical path opening 172 as they are rotated about their mutual pivot at 352. To provide for the mechanical movement of the opening and closing blades during an exposure, each is biased for rotation by spring means. For instance, blade 350 is biased for rotation by a wire spring 360 centrally wound about a spring hanger 362. The spring 360 has a stationary side, the tip of which is fixed to a bracket 364 mounted on base portion 166. A translational side of the spring 360 is shown extending from hanger 362 to assert biasing force upon opening blade 350 through pressure exerted against a radial flange 366 formed integrally with the blade. Closing blade 356 is biased for rotation about pivot 352 by a wire spring 368. Spring 368 is slidably wound about a spring hanger or capstan 370 fixed to base 164. The stationary side of spring 368 is retained within a spring tension adjusting fixture 372 mounted upon base 164. Fixture 372 includes a notch as at 374 within which one side of the spring 368 is insertable. By varying the level of this notch, the tension imposed by spring 368 upon the closing blade may be adjusted. The transitional side of spring 368 is connected to a radial edge of closing blade 356 by a tab member 376 extending from its lowermost edge. Thusly tensioned between fixture 372 and tab 376, the spring 368 functions to bias the closing blade 356 for counterclockwise rotation.

Opening and closing blades 350 and 356 are retained in a preexposure, cocked position by virtue of their engagement respectively with tab 266 of changeover arm 256 and a closing blade release latch 378. Tab 266 of changeover arm 254 is illustrated extending from the opposite side of baseplate portion 166 through a rectangular opening 380 formed therein. In cocked position, the tab 266 abuts against the forward edge of a corresponding tab 382 protruding outwardly and radially from the curved upper edge of opening blade 350. The tab 382 also has an outwardly bent flange portion 384 which cooperates in abutting relationship with a corresponding notch 386 formed within closing blade 356.

Closing blade release latch 378 is rotatably mounted upon base portion 168 at a pivotal stud 388 depending from the base. The latch is biased for rotation out of contact with blade 356 by a wire spring 390 slidably wound about stud 388. A retainer ring 392 holds the assembly in place upon the stud 388 and baseplate 164. Spring 390 has a stationary end configured to abut against upstanding tab 394 in base portion 168. The transitional end of spring 390 is coupled to one arm of release latch 378 at a tab 396. Opposite tab 396, release latch 378 is formed having an L-shaped flange 398 which is arranged to abut against a corresponding tab portion 400 extending radially from the outward edge of blade 356.

The opposite side of closing blade release latch 378 extends through opening 226 in the baseplate portion 168 to pivotally connect with a magnetizable keeper 402 on the opposite side thereof. The keeper 402, as shown more clearly in FIGS. 6 and 7, abuts against the pole of an electromagnet 404 fixed to base portion 168. Electromagnet 404 has a sufficient magnetic attractive force, when energized, to retain keeper 402 and latch 378 in position against the bias exerted by wire spring 390.

Figure 12:
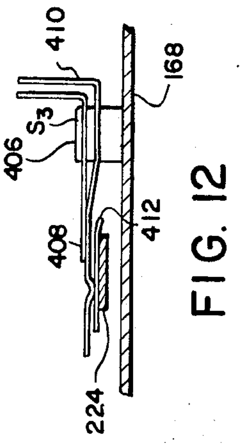
FIG. 12 is a fragmentary view of a portion of the exposure mechanism of the invention showing a switching structure in more detail.

Mounted upon base portion 168 and positioned above electromagnet 404 is a switch $S_3$ having a normally open or free position. Referring additionally to FIG. 12, switch $S_3$ is formed of an insulated base portion 406 which is fixed to the baseplate 168. Insulative base 406 retains two resilient terminal members 408 and 410 in a normally open or noncontacting position. The switch is oriented, however, with respect to the face of loading arm 224 such that the loading arm holds the switch $S_3$ in a closed orientation while in a retracted or preexposure position. As seen in FIG. 12, the arm 224 urges terminal member 410 against member 408. To assure the electrical integrity of the switching arrangement, an insulative surface shown at 412 is riveted over a portion of the contacting surface of arm 224. During shutter operation, as loading arm 224 is released for rotation, surface 412 moves out of engagement with terminal member 410 and permits switch $S_3$ to open.

Turning to FIG. 11, the elements of the shutter mechanism are portrayed as they are oriented during an exposure interval. In this regard, the tab 266 of changeover arm 254 has moved upwardly within the baseplate opening 380. As a result of this movement, the contact of tab 266 with tab 382 no longer exists and the opening blade 350 has been permitted to rotate to the position shown under the force of spring 360. Note also that the movement of changeover arm 254 has caused cylindrical contact member 264 to open the contact terminals 286 and 288 of switch $S_4$ (FIGS. 6 and 7). Annular opening 354 is now positioned in registry with the opening 172 in baseplate 164. The rotational travel of opening blade 350 is arrested by virtue of the contact of a forward edge of an L-shaped flange 416 with an upstanding tab 418 in base portion 166. The rotational movement of opening blade 350 has also caused the forward edge of tab 382 to cam against a resilient terminal member 420 of a switch $S_5$. Switch $S_5$ has an insulative supporting base 422 mounted upon baseplate portion 166 which supports the terminal member 420 and a corresponding fixed terminal member 424.

The shutter mechanism remains open as depicted until such time as keeper 402 is released from electromagnet 404. Electromagnet 404 contains as a component a coil as described at 124 in FIG. 3. Consequently, the deenergization of the electromagnet functions to terminate an exposure interval. As keeper member 402 is released, closing blade release latch 378 rotates under the bias of spring 390. This rotation releases tab 400 on closing blade 356 from its engagement with corresponding flange 398 on the release arm 378. The resultant disengagement permits the closing blade 356 to rotate under the bias of spring 368 until the notch formed in the blade at 386 engages the flange portion 384 of tab 382 in the opening blade 350. Such engagement halts the movement of the closing blade 356 at a position appropriately occluding passage of light through the aperture of the camera.

A cocking arrangement is provided in conjunction with the shutter mechanism. The arrangement includes a base portion 430 which is coupled with the stem portion 320 of the aperture cocking mechanism to provide for their simultaneous operation. The base portion 430 is slidable across baseplate 164 and includes an upstanding end section 432 to which is affixed a pin 434 slidable within a corresponding slot 436 disposed in a portion of baseplate 164. The latter pin and slot arrangement provides for horizontal alignment of the cocking system during its reciprocal movement. End section 432 has a camming edge 438 which cooperates with and abuts against a stud 440 fixed to the edge of opening blade 350. As the cocking assembly is moved from left to right, the camming edge 438 engages the stud 440 and causes opening blade 350 to rotate until such time as it is relatched at flanges 266. The rotation of opening blade 350 during the cocking sequence, in turn, provides for the rotative return of closing blade 356 to its preexposure position. This cooperative arrangement is provided by virtue of the engagement of notch 386 in the closing blade with the outstanding flange 384 situated in the outer edge of the opening blade 350.

OPERATION-AMBIENT ILLUMINATION

The circuitry of the system as described in connection with FIGS. 1 through 4 operates in conjunction with an exposure mechanism such as that illustrated in FIGS. 6 to 12. An exposure sequence is initiated as a camera or similar photographic apparatus within which the system is mounted is oriented towards a scene to be photographed and the release button 248 is depressed. As button 248 moves downward, switch $S_1$ is closed to energize the circuitry of the system. As a consequence, the normally conducting stages of trigger circuits 78 and 120 function, respectively, to cause the energization of coils 94 and 124. These coils form respective components of electromagnets 274 and 404. To assure that the normally conducting portion of trigger circuit 78 is operating at the closure of switch $S_1$, capacitor $C_3$ functions, as described earlier, to align the signal to the trigger circuit 78 input at line 88. The energization of electromagnet 274 provides a magnetic union between the magnet and keeper 240 which is pivotally attached to the changeover arm 254. In this retracted position, the changeover arm 254 holds the common contact 276 of switch $S_2$ against lower contact 280. This orientation of the switch corresponds to a switch $S_2$ connection with terminal (a) of FIG. 3. In this orientation, changeover arm 254 also holds the lever portion 296 of braking arrangement 290 in a retracted position. Further, the tab 266 of the arm retains the opening blade 350 of the shutter mechanism in position by virtue of its contact with the forward edge of tab 382.

As release button 248 moves downward, the lower surface of release bracket 250 cams against the cam surface 246 of release latch 234 to cause the latch to rotate about its pivotal mounting at 236 and release its latching engagement with tab 240 extending from the loading arm 224. Thus released, the loading arm 224 pivots about its bushing 228 under the bias of spring 230 to allow its lower flange 222 to strike the corresponding flange 220 depending from aperture blade release latch 210. The pivotal movement of the loading arm also releases springs 326 and 328 from engagement respectively with magnetic keepers 260 and 402. Keepers 260 and 402 now remain in the positions indicated in FIGS. 6 and 10 by virtue of the power supply energization of their respective electromagnets 274 and 404. As revealed more clearly in FIGS. 10, 11 and 12, movement of the loading arm 224 also causes the opening of switch $S_3$, thereby opening the bypass shunt line 92 about capacitor $C_1$, permitting the latter to be charged by the ramp-adjusted signal of the light-sensing circuitry 30. Switch $S_3$ is opened substantially at the instant that flange 222 of the loading arm strikes flange portion 220 of aperture blade release latch 210. The resultant rotation of latch 210 causes the disengagement of its latching tip 214 from a corresponding slot in flange 216 of aperture-defining blade 174. Note that at this point of the sequence of operation, the brake arrangement 290 is maintained in the orientation depicted in FIG. 8 by the downwardly positioned changeover arm tip portion 268.

With the unlatching of aperture blade 174, the mechanically linked blades 174 and 176 pivot under the bias of loading spring 192 in opposite directions toward a fully opened position. This movement is of a continuous nature and, as it occurs, the contours of notches 178 and 180 define a progressively enlarging aperture opening 182 over the camera optical path.

Simultaneously and in synchronism with the opening of the aperture before the optical path, an elongated opening or slot 204 of vane 202 is moved across the face of photovoltaic cell 32 positioned within annular mounting 208. The amount of light permitted to impinge upon the photovoltaic cell 32 varies in coordinated fashion with the exposure aperture determined by coacting aperture notches 178 and 180. Note in this regard that at the initiation of the pivotal movement of the aperture blades, elongated opening or slot 204 presents only a minimal light transmittal area before the face of photovoltaic cell 32. As the pivotal movement of the aperture blades progresses, however, the amount of light permitted to reach the photovoltaic cell 32 is increased to a maximum representing the largest aperture dimension available in the system. With such a synchronous relationship between the exposure aperture and the aperture before the photovoltaic cell 32, the output signal of cell 32 is controlled to represent a function of aperture size.

As discussed in connection with FIG. 3, the output of photovoltaic cell 32 is presented to amplification stage 34 and its feedback path including line 42, resistor $R_1$ and line 44. A voltage signal representative of the output of cell 32 is then developed at line 40 whereupon it is adjusted at a second amplification stage 46 including a feedback path incorporating resistor $R_3$. The latter amplification stage adjusts the signal in accordance with the sensitometric properties of the photosensitive media being exposed. The output of the second amplification stage is present at a common terminal denoted at 56 from which it is directed through line 58, whereat it undergoes a voltage level shift before presentation to trigger circuit 78. It is presented to circuit 78 along with a function generator ramp signal derived from a charging arrangement of resistor $R_6$ with capacitor $C_1$. As the photocell 32 continues to monitor scene light levels and relative aperture, a voltage at capacitor $C_1$ builds up until the triggering level of switching circuit 78 has been reached. As this triggering level is reached, transistor $Q_1$ of the voltage-sensing trigger circuit 78 is forward biased into conduction. The conduction of transistor $Q_1$ removes the bias from normally conducting transistor $Q_2$, thereby deenergizing coil 94 of electromagnet 274. A deenergization of electromagnet 274 removes the attractive force imposed upon keeper 260, thereby permitting changeover arm 254 to rotate under the bias of spring 270.

The rotation of changeover arm 254 serves a variety of exposure regulation functions. The upward movement of its camming tip 268 releases the retracting portion 298 of braking arrangement 290. This release permits the latching portion of the brake to rotate under the bias of spring 302 into contact with aperture blade 176, thereby arresting its movement at an aperture setting determined in accordance with the triggering of circuit 78. Simultaneously bearing member 262 of the arm 234 releases the common contact 276 of switch $S_2$, thereby permitting its contact with upper contact member 282. This switching action is represented in FIG. 3 as a movement of a contact member of switch $S_2$ from terminal (a) to terminal (b). As a consequence of the switching, an alternate feedback path is inserted about the amplifier stage 34. Simultaneously, the bearing member 264 on the changeover arm 234 is moved upwardly against leaf 28*b* of switch $S_4$. This movement opens the contacts of switch $S_4$ and, as depicted in the circuit of FIG. 3, the shunt path including line 118 about capacitor $C_2$ is opened, thereby permitting capacitor $C_2$ to be charged by the output signal of photovoltaic cell 32. Simultaneously with the above switching, tab 266 of the changeover arm 234, which is shown extending through opening 380 in the baseplate 164, moves upwardly to release its latching contact with tab 382 of shutter opening blade 350. The system has therefore shifted in sequence from its aperture-determining mode to its exposure interval or shutter-timing mode.

As depicted in FIGS. 10 and 11, the unlatching of tab 266 from the forward surface of tab 382 permits the opening blade 350 to pivot under the bias of spring 360 into an open position wherein opening 354 is aligned in registry with the optical path of the camera. With this opening, an exposure interval is commenced. During the conversion of the system from operation in an aperture-regulating mode to an exposure interval regulating mode, the symmetry of the power level of buses 66 and 68 about reference bus 70 is maintained throughout the change in state of coil 94 by the emitter-follower arrangement including transistor $Q_5$ and resistor $R_{12}$.

The photographic exposure interval commences as the leading edge of the opening 354 in opening blade 350 starts to uncover the previously determined aperture. During this interval, closing blade 356 is retained in the noncovering position by virtue of engagement of its tab portion 400 with a corresponding L-shaped flange 398 of closing blade latch 378. Latch 378 is held in position by virtue of the magnetic attraction between its keeper member 402 and electromagnet 404. With the opening of switch $S_4$ and the movement of the contact terminal of switch $S_2$ to terminal (b), the photovoltaic cell 32 generates a linear current mode signal in response to scene light passing through the elongated opening 204 of aperture blade 174. Light-sensitive circuit 30 then monitors the light levels of the scene and provides an output which is calibrated at resistor $R_2$ and adjusted at amplification stage 46 in accordance with the sensitometric properties of the photosensitive material being exposed. The output signal from the latter amplification stage passes along line 60 through diode 122 and into voltage-sensitive trigger circuit 120. Note that the second amplification stage 46 is used without change in both modes. As the output signal passing diode 122 reaches the triggering level of circuit 120, transistor $Q_3$ of the voltage-sensitive circuit is forward biased into conduction. The conduction of transistor $Q_3$ removes the bias from normally conducting transistor $Q_4$, thereby deenergizing coil 124 of electromagnet 404. Deenergization of electromagnet 404 removes its attractive force with keeper 402, permitting closing blade latch 378 to rotate under the bias of spring 390 into a position wherein its flange 398 is disengaged from tab 400 of the closing blade 356. As a consequence, the blade 356 pivots under the force of spring 368 to a closing terminal position wherein the notch 386 in its upper surface engages the flange extension 384 in tab 382. The optical path of the system is thereby covered and exposure is terminated. The exposure interval defined by the control system circuit additionally is determined with respect to the dynamics of the opening and closing blades of the shutter mechanism. Generally, a time lag is encountered in causing opening blade 350 to commence to move. Similarly, a dynamic lag is encountered between the firing of trigger circuit 120 and the commencement of movement of closing blade 356. Usually, these lag times are substantially equivalent and therefore mutually compensatory. The "photographic" exposure timing interval therefore lags the "electronic" exposure timing interval with no adverse effect.

Switch $S_1$ is maintained in a closed position throughout the above-described operation by the camera operator. The period of time required to complete an exposure sequence is normally very short, usually being about 25 to 35 milliseconds.

The exposure mechanism may be recocked by moving the cocking ram including its interconnected stems 320 and 430 against the bias of spring 334. As this occurs, the camming surface 332 of upstanding stem 330 cams against stud 196 on aperture blade 174 causing it to rotate into a closing terminal position. Simultaneously, the point of setscrew 324 moves against flange 222 of the loading arm 224, causing the arm to rotate away from its release position. As a result of this rotation, springs 326 and 328 mounted upon the loading arm 224 respectively abut against keepers 260 and 402 and force them into appropriate positions respectively against electromagnets 274 and 404. The resilient spring members 326 and 328 permit a minor amount of overtravel in the cocking mechanism without damage to the mechanical system. As aperture blade 174 moves into its preexposure terminal position, the flange 216 cams against latching tip 214 permitting its reinsertion into the slot within the flange. The movement of keeper 260 into position against electromagnet 274 also returns changeover arm 254 into preexposure position thereby reestablishing its association with brake arrangement 290 and with switches $S_2$ and $S_4$.

Simultaneously with the movement of camming surface 332, camming edge 438 of tip portion 432 cams against stud 440 of opening blade 350. As stem portion 432 moves inwardly, opening blade 350 and closing blade 356, now latched at tab 384, move into preexposure positions in coordination with the repositioning of tab 266 and flange 398. As the loading arm 234 is moved to its preexposure position, the tip 238 of release latch 234 cams over tab 240 to reassert its latching relationship with the loading arm. The movement of the loading arm 234 into its preexposure position also causes the closing of switch $S_3$ by virtue of the wiping action of surface 412 of the arm 224 against terminal member 410.

Following the above-described recocking maneuver, the cocking mechanism is returned to its preexposure condition under the bias supplied by spring 334. Its return movement is limited by pin 340.

OPERATION-TRANSIENT ILLUMINATION

When operating with transient illumination, for instance as with a flash apparatus, the control system of the invention adjusts relative aperture in accordance with anticipated scene light by a follow-focus arrangement as discussed earlier and indicated functionally in FIGS. 6 and 7 at 306. Following such mechanical setting limiting maximum aperture blade travel, exposure interval is determined as described in the ambient illumination case with light-sensing circuit 30. It will be recalled that circuit 30 establishes exposure interval in accordance with both scene light and preselected aperture. As a consequence, a "gross and vernier" control is available for most flash-illuminated photographic situations wherein the preliminary aperture regulation may be determined with slightly less accuracy. In flash photography, particular advantage may be taken of this flexibility by setting an aperture of slightly more area than normally required for a "follow-focus" adjustment. This permits a correspondingly enhanced light-gathering effect through the lens system which may accommodate manufacturing variations in flashbulb light sources. Another advantage derived from the use of circuit 30 for exposure interval determination when operating in a flash mode resides in the responsiveness of the circuit to ambient as well as transient or flash illumination discussed earlier in connection with FIG. 5. As a result, the control system is useful for "fill-in" flash illumination procedures.

To assure that an exposure interval terminates within an appropriate predetermined time, auxiliary timing circuit 150 is provided. Circuit 150 is preferably calibrated to terminate a flash-illuminated exposure at such time as substantially all light energy available in a flashbulb has been expended.

The procedure for making a flash exposure involves the insertion of a flashbulb or similar unit 154 into line 152 as shown in FIG. 3. As an additional preliminary step, switch $S_6$ is closed against terminal (b) by manual or equivalent means.

Follow-focus adjust mechanism 306 is a manually adjusted arrangement for selecting relative aperture in accordance with the flash source-to-subject distance. Accordingly, through the linkage 308, travel-limiting lever 310 is manipulated such that its flange 312 is at an elevation within slot 314 which limits the outward travel of aperture blade 174 by abutting against its outward edge when the blades are released. Following this adjustment of the elevation of flange 312, the exposure mechanism is ready to make an exposure. The following operational description assumes a lighting situation wherein an exposure is terminated only by the action of auxiliary timing circuit 150 termination by virtue of the activity of light-sensing circuitry 30 having been discussed above in connection with ambient lighting situations.

As in the procedure for making exposures under ambient conditions of illumination, release button 248 is depressed to energize the circuitry including electromagnets 274 and 404 and to release the aperture blade latch 210 through the earlier described loading arm mechanism. With the release of latch 210, blades 174 and 176 open under the bias of loading spring 192 until the leading edge of blade 174 strikes flange 312 to define an appropriate aperture setting. The movement of loading arm 224 permits the opening of switch $S_3$ (FIGS. 11 and 12) thereby permitting capacitor $C_1$ to be charged to an appropriate triggering voltage by the earlier discussed function generator ramp signal through line 90 and resistor $R_6$. Resistor $R_6$ and capacitor $C_1$ form an R-C timing circuit the voltage buildup from which is presented across the base-emitter junction of transistor $Q_1$ of trigger circuit 78. The time constant involved in charging to the trigger level of the trigger circuit 78 amounts to about 25 milliseconds, or enough time for the aperture blades 174 and 176, if necessary, to open to their fullest extent. The resultant triggering of circuit 78 causes the deenergization of coil 94 and consequently electromagnet 274. A resultant release of keeper 260 on changeover arm 254 provides for the release of opening blade 350 from its latching engagement with tab 266 of the changeover arm. Opening blade 350 pivots about stud 352 until it is fully open and its leading edge abuts against tab 418. As blade 350 rotates, its flange extension 416 strikes resilient terminal member 420 of switch $S_5$ to urge it into contact with terminal 424 and close the switch. The closure of switch $S_5$ completes the line 152 circuit between power buses 66 and 68 and energizes or fires flashbulb 154. Simultaneously, auxiliary timing circuit 150 is activated. Following an appropriate interval determined by the R-C timing-integrating arrangement including resistor $R_{16}$ and capacitor $C_4$ in conjunction with transistor $Q_6$, the auxiliary timing circuit switches the state of the voltage-sensitive triggering circuit 120. The switching of circuit 120 operates upon the mechanism as earlier described by releasing keeper 402 from electromagnet 404 and causing the disengagement of flange 398 of latch 378 from a corresponding tab 400 on the closing blade 356. The rotation of closing blade 356 under the bias of loading spring 368 functions to terminate the exposure following a predetermined exposure interval time as above discussed. At the termination of a flash exposure, the exposure mechanism may be recocked in the same manner as described in connection with ambient illumination operation.

Since certain changes may be made in the above exposure control system without departing from the scope of the invention herein involved, it is intended that all matter contained in the above description or shown in the accompanying drawings shall be interpreted as illustrative and not in a limiting sense.

I claim:

1. An exposure control system for photographic apparatus comprising:
  - aperture-determining means adjustable over a range of exposure values;
  - shutter means for controlling the exposure interval during which scene light is permitted to pass through the aperture determined by said aperture-determining means;
  - electronic control means operable in an aperture mode and a shutter-timing mode,
  - said electronic control means when operating in its aperture mode being responsive to scene brightness for adjusting said aperture determining means automatically to establish for each selected level of scene brightness within a predetermined brightness range a different effective aperture area with a controlled relationship by which the product of brightness and the effective aperture area increases with increasing selected brightness levels,
  - said electronic control means when operating in its shutter-timing mode being responsive to the value of at least one selected electrical circuit parameter to control said shutter means in a manner determinative of exposure interval;
  - means for automatically adjusting said electrical circuit parameter of said electronic control means as a function of scene brightness and also as a function of the selected aperture area to establish for each level of scene brightness and its corresponding effective aperture area a different and unique value of said electrical circuit parameter; and
  - sequencing means operable upon initiation of an exposure cycle first to cause said electronic control means to operate in its aperture mode to provide automatic adjustment of effective aperture area as a function of scene brightness and thereafter to cause said electronic control means to operate in its shutter-timing mode to control exposure interval in response to the adjusted value of said electrical circuit parameter such that for each different level of scene brightness and its corresponding effective aperture area, there is established a different and unique exposure interval corresponding thereto.

2. The exposure control system of claim 1 wherein said electronic control means includes function-generating means operable during said aperture mode for influencing said aperture-defining means adjustment in accordance with said controlled relationship.

3. An exposure control system as set forth in claim 2 in which said function generating means include means for generating an electrical signal which varies as a function of time.

4. An exposure control system as set forth in claim 3 in which the time-varying characteristic of said electrical signal is substantially simulative of the time-dependent-dynamic characteristics of said aperture defining means adjustment.

5. An exposure control system as set forth in claim 3 wherein said sequencing means includes means responsive to the attainment by said time-varying electrical signal of a preselected condition for causing said electrical control means to operate in its shutter-timing mode.

6. An exposure control system as set forth in claim 5 including flash mode setting means actuable as a function of a photographic parameter to set a preselected maximum aperture area for flash operation thereby to limit the range of adjustment of said automatically operable aperture-defining adjustment means to said maximum aperture area.

7. An exposure control system for photographic apparatus comprising:
  - aperture-determining means adjustable over a range of exposure values;
  - means responsive to scene brightness for adjusting said aperture-determining means automatically over a preselected scene brightness range to establish for each selected level of scene brightness within said brightness range a preselected different aperture area with a controlled relationship in which the product of brightness and the effective aperture area increases with increasing selected brightness levels;
  - shutter means for controlling the exposure interval during which scene light is permitted to pass through the aperture determined by said aperture-determining means;
  - electronic control means for controlling said shutter means responsive to the value of at least one selected electrical circuit parameter in a manner determinative of exposure interval;
  - means for automatically adjusting said electrical circuit parameter as a function of scene brightness over said preselected brightness range and also as a function of the controlled aperture area corresponding thereto to establish for each selected level of scene brightness and its corresponding controlled aperture area a different and unique value of said electrical circuit parameter; and
  - sequencing means operable upon initiation of an exposure cycle first to cause said aperture determining means to provide automatic adjustment of aperture area as a function both of scene brightness and of the corresponding controlled aperture area and thereafter operable to activate said control means to control exposure interval responsive to the adjusted value of said electrical circuit parameter to establish, over said brightness range, for each different level of scene brightness and its corresponding controlled aperture area, a different and unique exposure interval corresponding thereto.

8. An exposure control system as set forth in claim 7 in which means responsive to scene brightness for adjusting said aperture-determining means includes function generating means for generating an electrical signal which varies as a function of time.

9. An exposure control system as set forth in claim 8 in which the time-varying characteristic of said electrical signal is substantially simulative of the time-dependent-dynamic characteristics of said aperture-defining aperture means.

10. An exposure control system for photographic apparatus comprising:

aperture-defining means having at least one element movable between terminal positions defining minimum and maximum exposure apertures;

drive means having a predetermined dynamic characteristic for moving said element from one of said terminal positions to another at a reproducible rate;

means having a predetermined dynamic response to actuation for halting the movement of said element at selected intermediate aperture-defining positions;

light-sensitive circuit means responsive to the aperture defined by the said element and to the light level of a scene for generating an output signal;

summing means for combining said output signal with an adjusting signal over a period of time corresponding with said element movement to interrelate said drive means dynamic characteristic, said halting means dynamic response and said scene light in accordance with a predetermined program;

voltage-sensitive circuit means operative in response to said combined light-sensitive circuit means output signal and said adjusting signal for actuating said halting means, whereby said aperture-defining means element is halted at a position defining an exposure aperture in accordance with said predetermined exposure program; and shutter means responsive to the aperture defined by said element and to said scene light for regulating the interval of an exposure through said aperture in accordance with said predetermined exposure program.

11. The exposure control system of claim 10 in which said summing means includes timing circuit means for generating said predetermined adjusting signal.

12. The exposure control system of claim 10 in which:

said summing means includes means for generating said adjusting signal; and said generating means is operative to derive said adjusting signal as a progressively varying voltage.

13. The exposure control system of claim 12 in which said summing means includes means for initiating the actuation of said generating means simultaneously with the initiation of said movement of said aperture-defining means element.

14. The exposure control system of claim 10 in which said summing means comprises:

capacitor means for deriving said adjusting signal as a varying voltage; and means for selectively charging said capacitor means over a time interval determined in correspondence with the movement of said aperture means element.

15. The exposure control system of claim 10 in which said summing means comprises:

capacitor means coupled with said voltage-sensitive circuit means for forming a variable voltage; and means for charging said capacitor means at a select rate over an interval substantially coincident with the said movement of said aperture-defining means element so as to derive said adjusting signal as said variable voltage.

16. An exposure control system for photographic apparatus comprising:

aperture-defining means having at least one element movable between terminal positions defining minimum and maximum exposure apertures;

drive means for urging said element to move at a reproducible rate from one terminal position to another;

brake means having a predetermined dynamic response for halting the movement of said element at select intermediate aperture-defining positions;

light-sensitive circuit means oriented with respect to a scene for generating a sensing output signal representative of the light levels thereof;

means for regulating said light-sensitive circuit means synchronously and in correspondence with the aperture defined by said element;

summing means, including capacitor means selectively chargeable in correspondence with the said movement of said aperture-defining means element and with respect to said brake means dynamic response, for generating an adjusting signal and for combining said adjusting signal and said regulated light-sensitive circuit output signal in accordance with select photographic program criteria;

trigger means operable in response to said signal combination reaching a predetermined threshold voltage for actuating said brake means to selectively halt said element; and shutter means responsive to the aperture defined by said element and to said scene light level for regulating the interval of an exposure through said aperture.

17. The exposure control system of claim 16 in which:

said light-sensitive circuit includes at least one photosensitive element arranged to receive light from said scene; and said regulating means comprises means for attenuating said scene light received by said photosensitive element synchronously and in correspondence with the movement of said aperture-defining means element.

18. The exposure control system of claim 17 including means for actuating said shutter means in response to the actuation of said brake means by said trigger means.

19. The exposure control system of claim 17 wherein said summing means signal combination and said trigger means predetermined threshold voltage are selected such that over a given range of light level values said aperture-defining element defines apertures having an aperture area to light value relationship of less than 1:1.

20. The exposure control system of claim 17 wherein said aperture-defining means is operative to define continuously variable apertures between said terminal positions.

21. The exposure control system of claim 17 wherein said aperture-defining means comprises a pair of opaque blades configured and arranged to mutually and synchronously coact to define continuously variable apertures when moved between said terminal positions.

22. The exposure control system of claim 21 wherein said scene light-attenuating means is formed as an elongate opening disposed within one said opaque blade.

23. An exposure control system for photographic apparatus comprising:

aperture-determining means having at least one element movable between terminal positions for determining a range of effective apertures;

shutter means for controlling the exposure interval during which scene light is permitted to pass through the aperture determined by said aperture-determining means;

drive means for urging said element to move with a time-dependent dynamic characteristic between said terminal positions;

arresting means for selectively halting the movement of said element in response to an aperture mode control signal;

function-generating means operable for generating a time-varying electrical signal functionally related to said drive means dynamic characteristic;

light-sensitive circuit means operable in an aperture mode and a shutter-timing mode, said light-sensitive circuit means when operating in its aperture mode being automatically responsive to scene brightness, the varying electrical signal of said function-generating means and the aperture determined by said movable element, for actuating said arresting means to halt said movable element of said aperture-determining means to establish for each selected level of scene brightness within a predetermined brightness range a different effective aperture area with a controlled relationship by which the product of brightness and the effective aperture area increases with increasing selected brightness levels;

said light-sensitive circuit means when operating in said shutter-timing mode being responsive to scene brightness and also to said selected aperture area for controlling said shutter means in a manner determinative of exposure interval; and sequencing means operable upon initiation of an exposure cycle first to cause said light-sensitive circuit means to operate in its aperture mode to provide automatic adjustment of effective aperture area as a function of scene brightness and thereafter to cause said light-sensitive circuit means to operate in its shutter-timing mode to control exposure interval such that for each different level of scene brightness and its corresponding effective aperture area, there is established a different and unique exposure interval corresponding thereto.

24. The exposure control system of claim 23 wherein said sequencing means includes means responsive to the attainment by said function-generating means time-varying electrical signal of a preselected condition for causing said light-sensitive circuit means to operate in its shutter-timing mode.

25. The exposure control system of claim 23 in which said function-generating means comprises:

capacitor means for deriving said time-varying electrical signal as a varying voltage; and means for selectively charging said capacitor means substantially simultaneously with the commencement of said movement of said aperture defining means element.

26. The exposure control system of claim 23 including means for activating said function-generating means upon initiation of an exposure cycle and substantially simultaneously with the commencement of said movement of said element.

27. The exposure control system of claim 26 wherein said arresting means is selected having a consistent and reproducable dynamic response to actuation by said light-sensitive circuit means.

28. The exposure control system of claim 27 wherein said light-sensitive circuit means includes trigger means operable to actuate said arresting means in response to said light-sensitive circuit means achieving a first preselected condition when in said aperture mode, and operative to regulate said shutter means in response to said light-sensitive circuit means achieving a second preselected condition when in said shutter-timing mode.

29. The exposure control system of claim 28 in which said light-sensitive circuit means includes at least one photosensitive element arranged to receive scene light; and said system includes means for attenuating said scene light received by said photosensitive element synchronously and in correspondence with the movement of said aperture-defining means element.

30. The exposure control system of claim 28 wherein said sequencing means is operative to actuate said shutter means in response to the actuation of said arresting means by said trigger means.

31. The exposure control system of claim 28 wherein said function-generating means time varying electrical signal, said trigger means first preselected condition, said drive means dynamic characteristic and said arresting means dynamic response are selected such that over said predetermined brightness range said aperture-determining means element determines apertures having an effective aperture area to light value relationship of less than 1:1.

32. The exposure control system of claim 28 wherein said aperture-determining means element is operative to define continuously variable apertures between said terminal positions.

33. The exposure control system of claim 29 wherein said aperture-determining means comprises a pair of opaque blades configured and arranged to mutually and synchronously coact to define continuously variable apertures when moved between said terminal positions.

34. The exposure control system of claim 33 wherein said scene light-attenuating means is formed as an elongate opening disposed within at least one said opaque blade.

35. An exposure control system for photographic apparatus comprising:

aperture-determining means including at least one element movable from initial to terminal positions to define a range of exposure aperture values in accordance with a predetermined dynamic adjustment characteristic;

shutter means for controlling the exposure interval during which scene light is permitted to pass through the aperture determined by said aperture determining means;

function-generating means for generating a time-varying electrical signal functionally related to said dynamic adjustment characteristic of said aperture determining means, said signal reaching a preselected condition at least when said movable element reaches said terminal position;

circuit means operable in an aperture mode and a shutter-timing mode, said circuit means, when operating in its aperture mode being responsive to scene brightness and the varying electrical signal of said function generating means for adjusting said aperture-determining means automatically, said circuit means, when operating in its shutter-timing mode, being responsive to scene brightness and also to said selected aperture area for controlling said shutter means in a manner determinative of exposure interval; and sequencing means operable upon initiation of an exposure cycle first to cause said circuit means to operate in its aperture mode to provide automatic adjustment of effective aperture area as a function of scene brightness and thereafter to cause said circuit means to operate in its shutter-timing mode at least in response to the attainment by said time-varying electrical signal of said preselected condition.

36. The exposure control system of claim 35 wherein said circuit means includes trigger means operable to actuate said sequencing means to cause said circuit means to operate in its shutter-timing mode in response to the receipt of an electrical signal of said preselected condition.

37. An exposure control system for photographic apparatus comprising:

aperture-determining means variable over a range of exposure values in accordance with a predetermined dynamic adjustment characteristic;

shutter means for controlling the exposure interval during which scene light is permitted to pass through the aperture determined by said aperture-determining means;

function-generating means for generating a time-varying electrical signal functionally related to said dynamic adjustment characteristic of said aperture-determining means;

light-sensitive circuit means operable in an aperture mode and a shutter-timing mode, said light-sensitive circuit means, when operating in its aperture mode being responsive to scene brightness and the varying electrical signal of said function generating means for adjusting said aperture-determining means automatically, said light-sensitive circuit means, when operating in its shutter-timing mode, being responsive to scene brightness and also to said selected aperture area for controlling said shutter means in a manner determinative of exposure interval;

sequencing means operable upon initiation of an exposure cycle first to cause said light-sensitive circuit means to operate in its aperture mode to provide automatic adjustment of effective aperture areas as a function of scene brightness and thereafter to cause said light-sensitive circuit means to operate in its shutter timing mode at least in response to the attainment by said time varying electrical signal of a preselected condition; and flash mode setting means actuable as a function of a photographic parameter to set a preselected maximum aperture area for flash operation thereby to limit said variation of said aperture-determining means over said range of exposure values to a maximum aperture area.

38. The exposure control system of claim 37 in which:

said aperture-determining means includes at least one element movable from initial to terminal positions between which said range of exposure values is determined; and the generation time for said varying electrical signal of said function-generating means is selected for deriving said preselected condition in correspondence with the time required for said element to move from said initial to said terminal position.

39. An exposure control system for photographic apparatus comprising:

aperture-defining means having at least one element movable between terminal positions defining minimum and maximum exposure apertures;

drive means for urging said element to move at a reproducible rate from one said terminal position to another;

brake means for halting the movement of said element at select intermediate aperture-defining positions;

light-sensitive circuit means oriented with respect to a scene for generating a sensing output voltage signal representative of the light levels thereof;

means for regulating said light-sensitive circuit means synchronously and in correspondence with the aperture defined by said element so that said output signal is responsive to said aperture;

summing means for generating an adjusting voltage signal having a predetermined value following a select generation time, and for combining said adjusting voltage signal and said regulated light-sensitive circuit output voltage signal;

trigger means operative in response to said voltage signal combination reaching a value equal to said adjusting signal predetermined value for actuating said brake means to selectively halt said element;

shutter means for regulating the interval of an exposure through said aperture; and means for actuating said shutter means in response to the actuation of said trigger means by at least said adjusting voltage signal.

40. The exposure control system of claim 39 in which said summing means adjusting voltage signal generation time is selected for deriving said predetermined voltage value in correspondence with the time required for said moving of said aperture-defining element from one said terminal position to another.

41. The exposure control system of claim 39 including follow-focus means operative to selectively preempt the function of said brake means for limiting said movement of said aperture-defining means element in correspondence with the inverse square law of light energy propagation.

42. The exposure control system of claim 39 in which said summing means adjusting voltage signal generation time is selected for deriving said predetermined voltage value in correspondence with the time required for said moving of said aperture-defining element from one said terminal position to another; and including follow-focus means operative to selectively preempt the function of said brake means for limiting the said movement of said aperture-defining means element in correspondence with the anticipated light levels of an artificially illuminated scene.

43. The exposure control system of claim 39 in which said summing means comprises:

capacitor means for deriving said adjusting voltage signal;

means for selectively charging said capacitor means; and means for actuating said charging means substantially simultaneously with the initiation of said movement of said aperture-defining element.

44. The exposure control system of claim 43 in which said charging means is selected for causing said predetermined voltage signal value to be generated at said capacitor means following a generation time at least equivalent to the time required for said moving of said aperture from one said terminal position to another.

45. The exposure control system of claim 43 in which said charging means is selected for causing said predetermined voltage signal value to be generated at said capacitor means following a generation time at least equivalent to the time required for said moving of said aperture from one said terminal position to another; and including follow-focus means operative to selectively preempt the function of said brake means for limiting the said movement of said aperture-defining means element in correspondence with the anticipated light levels of an artificially illuminated scene.

46. The exposure control system of claim 45 including:

means for illuminating said scene to be photographed with artificial illumination;

means for energizing said illuminating means substantially at the commencement of said interval of exposure;

timing means isolated from said light-sensitive circuit means signal for generating an auxiliary output voltage signal having a select level following a predetermined interval commencing substantially simultaneously with the said energizing of said artificial illumination means; and voltage-sensitive switching means responsive to said auxiliary voltage signal for overriding said light-sensitive circuit means signal to cause the insertion of a voltage signal into said shutter-activating means, whereby said exposure interval may be terminated following a select, maximum period of time.

47. An exposure control system for use with photographic apparatus comprising:

an exposure mechanism having at least one controllable exposure parameter for regulating the exposure of a photosensitive material;

light detector means having an electrical parameter responsive to the light level of a scene to be photographed;

means responsive to said electrical parameter and forming a light-sensitive circuit with said light detector means for deriving an output signal responsive to the said light level of said scene;

amplifier means coupled to receive said light-sensitive circuit output signal and having a selectable gain corresponding with the sensitometric properties of said photosensitive material for adjusting said output signal in accordance therewith; and means responsive to said adjusted output signal for controlling said exposure parameter.

48. The exposure control system of claim 47 wherein said amplifier means comprises a differential amplifier having a feedback circuit incorporating impedance means connected between its input and output, said impedance means being selected for deriving said gain.

49. The control system of claim 47 including:

impedance means coupled between said light-sensitive circuit means and the input of said amplifier means for calibrating said light-sensitive circuit means.

50. The control system of claim 47 in which said amplifier means is present as a differential amplifier.

51. The exposure control system of claim 50 in which said amplifier means includes a feedback circuit incorporating resistor means having an impedance value selectable for calibrating said light-sensitive circuit means.

52. The exposure control system of claim 50 including:
impedance means coupled between said light-sensitive circuit means and the input of said differential amplifier, said impedance means having a value of impedance selectable to derive said gain.

53. The exposure control system of claim 50 including:
first impedance means coupled in series between said light-sensitive circuit means and the input of said differential amplifier;
said differential amplifier includes:
a feedback path coupled between the input and output thereof, said path including second impedance means; and
the impedance value of one of said first and second impedance means is selected in correspondence with said sensitometric properties.

54. The exposure control system of claim 53 in which the impedance value of one of said first and second impedance means is selected in correspondence with said sensitometric properties and the impedance value of the other of said first and second impedance means is selected for calibrating said light-sensitive circuit means.

55. An exposure control system for photographic apparatus comprising:
an exposure mechanism including means defining an exposure aperture having an effective area representing a first exposure parameter and for uncovering and covering said exposure aperture for an interval of time representing a second exposure parameter so as to regulate the exposure of a photosensitive material;
light-sensitive circuit means responsive to the light levels of a scene being photographed and operable in a first mode for providing an output signal evaluating said first parameter and in a second mode for providing an output signal evaluating said second parameter;
a differential amplifier coupled to receive and adjust said light-sensitive circuit output signals;
a feedback path having a select first impedance coupled between the input and output of said amplifier;
a second impedance means coupled in series between said light-sensitive circuit means and said differential amplifier input for varying said output signals;
means for selectively varying the impedance value of at least one said first impedance and second impedance means so as to adjust the gain of said amplifier in correspondence with the sensitometric properties of said photosensitive material; and
means responsive to said adjusted output signals for controlling said first and second exposure parameters.

56. The exposure control system of claim 55 in which said first impedance is provided by at least one resistor having a resistance value which is selected in correspondence with said sensitometric properties.

57. The exposure control system of claim 56 in which said second impedance means comprises at least one resistor having a resistance value selected for calibrating said light-sensitive circuit means for said second operational mode.

58. The exposure control system of claim 55 in which said second impedance means comprises at least one resistor having a value of resistance selected in correspondence with said sensitometric properties.

59. The exposure control system of claim 58 in which said first impedance is provided by at least one resistor having a resistance value selected for calibrating said light-sensitive circuit means for said second operational mode.

60. An exposure control system for photographic apparatus comprising:
means defining an exposure aperture having an effective area variable between select terminal values;
shutter means for uncovering and covering said exposure aperture means for select intervals of time;
aperture control mechanism means for regulating said variable effective area;
shutter control mechanism means for regulating said shutter means;
light-sensitive circuit means responsive to the light levels of a scene to be photographed and operable sequentially in an aperture regulation mode and shutter regulation mode for providing output voltage signals in correspondence therewith;
first voltage-sensitive trigger circuit means having an input stage coupled to receive said output voltage signals and responsive to a predetermined voltage level for actuating said aperture control mechanism means;
second voltage-sensitive trigger circuit means having an input stage coupled in common with said first trigger circuit means input stage to receive said output signals and responsive to a predetermined voltage level for actuating said shutter control mechanism means; and
means coupled with said second trigger circuit means for selectively adjusting the level of said light-sensitive circuit means output voltage signals, whereby said first and second voltage sensitive trigger circuit means are operative to function respectively in sequence to actuate said aperture and shutter control mechanism means.

61. The exposure control system of claim 60 including:
a DC power source having terminal outputs of opposite polarity; and
means for coupling said first and second voltage-sensitive circuit means in series across said power source so as to establish a reference level for said light-sensitive circuit means.

62. The exposure control system of claim 61 including compensating means for maintaining the voltage relationship between at least one voltage-sensitive circuit means and said reference level throughout an exposure sequence.

63. The exposure control system of claim 62 wherein said compensating means is operative in conjunction with the said voltage sensitive circuit means selected for the initial said exposure mechanism parameter control occurring during said exposure sequence.

64. The exposure control system of claim 63 in which said compensating means comprises bypass means for selectively assuming any voltage drop across said selected voltage-sensitive circuit means.

65. The exposure control system of claim 64 in which each of said first and second voltage sensitive circuit means comprises:
electromagnetic means coupled between said power source terminal output and said coupling means reference level for selectively actuating said control mechanism to regulate one said exposure parameter; and
a voltage-sensitive trigger circuit coupled to receive said output signal and, in response thereto, to cause the selective energization and deenergization of said electromagnetic means.

66. The exposure control system of claim 60 including alignment means coupled with the input stage of said first voltage-sensitive trigger circuit means for adjusting the voltage at said input stage to a selected value at the commencement of an exposure cycle.

67. The exposure control system of claim 60 in which said level-adjusting means comprises at least one unilaterally conductive element having a select forward resistance characteristic.

68. The exposure control system of claim 67 in which:
said first and second voltage-sensitive trigger circuits are operative to switch a current supply when at least one said output voltage signal reaches a predetermined level; and
said aperture and shutter control mechanism means include electromagnetic means selectively deenergizable in response to said switching.

69. The exposure control system of claim 68 in which said at least one unilaterally conductive element is selected as at least one diode.

70. An exposure control system for photographic apparatus comprising:

an exposure mechanism having control means for regulating the effective area of an exposure aperture and for regulating the interval of exposure through said exposure aperture;

light-sensitive circuit means responsive to the light levels of a scene to be photographed, said circuit means being operable sequentially in an aperture regulating mode and in an exposure interval regulating mode for providing output signals in correspondence therewith;

a power source having output terminals of opposite polarity;

first and second electromagnetic means coupled in series across said power source, for selectively actuating said exposure mechanism control means;

a first voltage-sensitive trigger circuit responsive to said output signals and coupled in switching relationship with said first electromagnetic means;

a second voltage-sensitive trigger circuit selectively responsive to said output signals and coupled in switching relationship with said second electromagnetic means; and alignment means coupled between one said power source output terminal and at least one said trigger circuit for assuring the responsiveness of said trigger circuit at the commencement of an exposure cycle.

71. The exposure control system of claim 70 wherein said alignment means comprises impedance means coupled between one said power source output terminal and the input of at least one said trigger circuit for adjusting the voltage at said input to a selected preexposure value.

72. The exposure control system of claim 71 wherein said impedance means comprises at least one capacitor.

73. The exposure control system of claim 72 in which the input of each said first and second voltage-sensitive trigger circuits includes a normally nonconducting transistor stage coupled in switching relationship to receive the output signals of said light-sensitive circuit means.

74. The exposure control system of claim 70 wherein said light-sensitive circuit means is configured having at least one differential amplification stage functioning in conjunction with a reference level voltage; and including means for interconnecting said first and second electromagnetic means and associated said first and second trigger circuits to develop said reference level voltage at their mutual junction.

75. The exposure control system of claim 74 including compensating means for maintaining the voltage relationship between the power source coupling of at least one said electromagnetic means, its associated trigger circuit and said reference level mutual junction.

76. The exposure control system of claim 75 in which:

said first voltage-sensitive trigger circuit is responsive to said output signals during said light-sensitive circuit means aperture-regulating mode; and said compensating means is operative in response to the actuation of said first voltage-sensitive trigger circuit.

77. The exposure control system of claim 76 in which said compensating means comprises:

impedance means coupled in parallel with said first electromagnetic means and associated said first voltage-sensitive trigger circuit for deriving a select voltage; and switching means responsive to said first voltage-sensitive trigger circuit for selectively conducting a current supply into said impedance means.

78. The exposure control system of claim 77 in which each said first and second voltage-sensitive triggering circuits includes a normally conducting stage coupled in switching relationship respectively with said first and second electromagnetic means, said normally conductive stages being operable to deenergize said electromagnetic means in response to select levels of said output voltage signals.

79. The exposure control system of claim 78 in which said switching means includes at least one transistor stage coupled for conductive response to the deenergization of said first electromagnetic means.

* * * * *